(12) United States Patent
Haws

(10) Patent No.: US 10,436,455 B2
(45) Date of Patent: Oct. 8, 2019

(54) HOT WATER RECOVERY

(71) Applicant: Spencer Kim Haws, Richland, WA (US)

(72) Inventor: Spencer Kim Haws, Richland, WA (US)

( * ) Notice: Subject to any disclaimer, the term of this patent is extended or adjusted under 35 U.S.C. 154(b) by 79 days.

(21) Appl. No.: 15/297,830

(22) Filed: Oct. 19, 2016

(65) Prior Publication Data

US 2017/0059186 A1    Mar. 2, 2017

Related U.S. Application Data

(60) Division of application No. 14/210,068, filed on Mar. 13, 2014, now Pat. No. 9,513,641, and a continuation-in-part of application No. 13/864,943, filed on Apr. 17, 2013, now Pat. No. 9,176,507, said application No. 14/210,068 is a continuation-in-part
(Continued)

(51) Int. Cl.
| | |
|---|---|
| *F24D 17/00* | (2006.01) |
| *G05D 23/13* | (2006.01) |
| *E03B 7/04* | (2006.01) |
| *F24D 19/10* | (2006.01) |
| *F16K 15/02* | (2006.01) |

(52) U.S. Cl.
CPC .......... *F24D 17/0005* (2013.01); *E03B 7/045* (2013.01); *F16K 15/026* (2013.01); *F24D 17/0026* (2013.01); *F24D 17/0094* (2013.01); *F24D 19/1051* (2013.01); *G05D 23/1306* (2013.01); *G05D 23/1313* (2013.01); *Y02B 30/18* (2013.01); *Y10T 137/6416* (2015.04); *Y10T 137/6497* (2015.04)

(58) Field of Classification Search
CPC .. E03B 7/045; F24D 17/0005; F24D 17/0094; Y10T 137/6497
USPC ........................................................ 137/337
See application file for complete search history.

(56) References Cited

U.S. PATENT DOCUMENTS

| | | |
|---|---|---|
| 2,838,073 A | 6/1958 | DiMattia et al. |
| 2,918,090 A | 12/1959 | DeWitt |

(Continued)

FOREIGN PATENT DOCUMENTS

| | | |
|---|---|---|
| CN | 201306795 Y | 9/2009 |
| FR | 2947615 A1 | 1/2011 |

(Continued)

OTHER PUBLICATIONS

Non-Final Office Action dated Aug. 1, 2017 from U.S. Appl. No. 14/851,451, 10 pages.

(Continued)

*Primary Examiner* — Marc E Norman
(74) *Attorney, Agent, or Firm* — Rainier Patents, P.S.; Paul W. Mitchell

(57) ABSTRACT

The concepts relate to reducing energy loss associated with hot water systems. One example is manifest as a system with an automatic hot water recovery apparatus and selective hot water isolation devices. In one example a selective hot water isolation device is configured to be connected in fluid flowing relation with a first water line and a second water line and the selective hot water isolation device is configured to control water cross-over from the second water line into the first water line based upon water flow through the first water line.

8 Claims, 35 Drawing Sheets

Related U.S. Application Data of application No. 13/864,943, filed on Apr. 17, 2013, now Pat. No. 9,176,507, said application No. 14/210,068 is a continuation-in-part of application No. 13/276,635, filed on Oct. 19, 2011, now Pat. No. 9,316,403.

(60) Provisional application No. 61/878,563, filed on Sep. 16, 2013, provisional application No. 61/637,173, filed on Apr. 23, 2012, provisional application No. 61/782,024, filed on Mar. 14, 2013, provisional application No. 61/405,359, filed on Oct. 21, 2010.

(56) References Cited

U.S. PATENT DOCUMENTS

| | | | |
|---|---|---|---|
| 3,847,307 A | 11/1974 | Hosek | |
| 4,181,156 A | 1/1980 | Zahid | |
| 4,210,125 A | 7/1980 | Fender | |
| 4,321,943 A | 3/1982 | Haws | |
| 4,450,829 A | 5/1984 | Morita et al. | |
| 4,518,007 A | 5/1985 | Haws | |
| 4,606,325 A | 8/1986 | Lujan, Jr. | |
| 4,628,902 A | 12/1986 | Comber | |
| 4,672,990 A | 6/1987 | Robillard | |
| 4,682,581 A | 7/1987 | Laing et al. | |
| 4,697,614 A | 10/1987 | Powers | |
| 4,798,224 A | 1/1989 | Haws | |
| 4,930,551 A | 6/1990 | Haws | |
| 4,945,942 A | 8/1990 | Lund | |
| 5,042,524 A | 8/1991 | Lund | |
| 5,205,318 A | 4/1993 | Massaro et al. | |
| 5,261,443 A | 11/1993 | Walsh | |
| 5,277,219 A | 1/1994 | Lund | |
| 5,323,803 A * | 6/1994 | Blumenauer | E03C 1/02 |
| | | | 122/13.3 |
| 5,347,956 A | 9/1994 | Hughes | |
| 5,351,712 A | 10/1994 | Houlihan | |
| 5,385,168 A | 1/1995 | Lund | |
| 5,452,740 A | 9/1995 | Bowman | |
| 5,555,997 A | 9/1996 | Nogles | |
| 5,584,316 A | 12/1996 | Lund | |
| 5,586,572 A | 12/1996 | Lund | |
| 5,596,952 A | 1/1997 | Lannes et al. | |
| 5,606,996 A | 3/1997 | Sugimura | |
| 5,775,372 A | 7/1998 | Houlihan | |
| 5,799,827 A | 9/1998 | D'Andrade | |
| 5,806,511 A | 9/1998 | Hart | |
| 5,819,785 A | 10/1998 | Bardini | |
| 5,823,177 A | 10/1998 | Whitehead | |
| 5,829,475 A | 11/1998 | Acker | |
| 5,860,452 A | 1/1999 | Ellis | |
| 5,887,616 A | 3/1999 | Ikeda et al. | |
| 6,039,067 A | 3/2000 | Houlihan | |
| 6,347,748 B1 | 2/2002 | Lyons | |
| 6,418,969 B1 | 7/2002 | Bertagna | |
| 6,536,464 B1 | 3/2003 | Lum et al. | |
| 6,588,377 B1 | 7/2003 | Leary et al. | |
| 6,745,723 B1 | 6/2004 | Hicks et al. | |
| 6,920,844 B1 | 7/2005 | Ismert | |
| 6,935,357 B2 | 8/2005 | Taylor et al. | |
| 6,962,162 B2 | 11/2005 | Acker | |
| 7,073,528 B2 | 7/2006 | Kempf et al. | |
| 7,077,155 B2 | 7/2006 | Giammaria | |
| 7,140,382 B2 | 11/2006 | Kempf et al. | |
| 7,198,059 B2 | 4/2007 | Kempf et al. | |
| 7,287,707 B2 | 10/2007 | Kempf et al. | |
| 7,475,703 B2 | 1/2009 | Kempf et al. | |
| 7,487,923 B2 | 2/2009 | Willsford et al. | |
| 7,634,976 B2 | 12/2009 | Gordon et al. | |
| 7,648,078 B2 | 1/2010 | Kempf et al. | |
| 7,690,395 B2 | 4/2010 | Jonte et al. | |
| 7,740,182 B2 | 6/2010 | Lum | |
| 7,779,857 B2 | 8/2010 | Acker | |
| 8,534,310 B1 * | 9/2013 | Ziehm | E03B 7/045 |
| | | | 137/337 |
| 9,176,507 B2 | 11/2015 | Haws | |
| 9,316,403 B2 | 4/2016 | Haws | |
| 9,353,955 B1 | 5/2016 | Haws | |
| 9,513,641 B1 | 12/2016 | Haws | |
| 9,879,658 B2 * | 1/2018 | Graves | F03G 7/065 |
| 2003/0032854 A1 | 2/2003 | Palmer | |
| 2005/0001046 A1 | 1/2005 | Laing | |
| 2005/0034774 A1 | 2/2005 | Lombari et al. | |
| 2006/0022062 A1 | 2/2006 | Morris | |
| 2006/0144455 A1 | 7/2006 | Meyers et al. | |
| 2007/0114297 A1 | 5/2007 | Burningham | |
| 2008/0035303 A1 | 2/2008 | Fuller | |
| 2008/0230126 A1 | 9/2008 | Acker | |
| 2008/0272116 A1 | 11/2008 | Martucci et al. | |
| 2010/0096018 A1 | 4/2010 | Wylie et al. | |
| 2011/0139269 A1 | 6/2011 | Rogers | |
| 2012/0118414 A1 | 5/2012 | McMurtry | |
| 2013/0327790 A1 | 12/2013 | Ryan | |
| 2015/0377497 A1 | 12/2015 | Haws | |
| 2016/0003485 A1 | 1/2016 | Haws | |

FOREIGN PATENT DOCUMENTS

| | | |
|---|---|---|
| GB | 2145205 A | 3/1985 |
| JP | 06347095 A | 12/1994 |
| WO | 2010/103521 A2 | 9/2010 |

OTHER PUBLICATIONS

Restriction Requirement dated Jul. 14, 2017 from U.S. Appl. No. 14/752,612, 6 pages.

Response to Restriction filed Sep. 7, 2017 from U.S. Appl. No. 14/752,612, 8 pages.

International Preliminary Report on Patentability dated Jan. 12, 2017 from PCT Patent Application No. PCT/US2015/038160, 10 pages.

Non-Final Office Action dated Aug. 5, 2015 from U.S. Appl. No. 13/276,635, 12 pages.

Response filed Dec. 4, 2015 to the Non-Final Office Action dated Aug. 5, 2015 from U.S. Appl. No. 13/276,635, 8 pages.

Notice of Allowance dated Feb. 8, 2016 from U.S. Appl. No. 13/276,635, 15 pages.

Corrected Notice of Allowability dated Mar. 9, 2016 from U.S. Appl. No. 13/276,635, 6 pages.

International Search Report and Written Opinion dated Mar. 5, 2013 from PCT Patent Application No. PCT/US2011/056896, 18 pages.

International Preliminary Report on Patentability dated Apr. 23, 2013 from PCT Patent Application No. PCT/US2011/056896, 11 pages.

Notice of Division of Application dated Jun. 1, 2015 from Chinese Patent Application No. 201180043700.3, 2 pages.

First Office Action dated Oct. 29, 2015 from Chinese Patent Application No. 201180043700.3, 14 pages.

Notice on Grant of Patent Right for Invention dated Jul. 11, 2016 from Chinese Patent Application No. 201180043700.3, 4 pages.

Non-Final Office Action dated Jul. 14, 2015 from U.S. Appl. No. 13/864,943, 7 pages.

Response filed Jul. 24, 2015 to the Non-Final Office Action dated Jul. 14, 2015 from U.S. Appl. No. 13/864,943, 6 pages.

Notice of Allowance dated Aug. 10, 2015 from U.S. Appl. No. 13/864,943, 16 pages.

Corrected Notice of Allowability dated Oct. 2, 2015 from U.S. Appl. No. 13/864,943, 7 pages.

Preliminary Amendment filed Oct. 29, 2015 from U.S. Appl. No. 14/851,451, 5 pages.

International Search Report and Written Opinion dated Nov. 30, 2015 from PCT Patent Application No. PCT/US2015/038160, 13 pages.

U.S. Appl. No. 61/782,024 titled "Hot Water Recovery," filed Mar. 14, 2013 by inventor Spencer Kim Haws, 193 pages.

Requirement for Restriction/Election dated May 23, 2016 from U.S. Appl. No. 14/210,068, 6 pages.

(56) References Cited

OTHER PUBLICATIONS

Response filed Jul. 25, 2016 to the Requirement for Restriction/Election dated May 23, 2016 from U.S. Appl. No. 14/210,068, 9 pages.
Notice of Allowance dated Aug. 22, 2016 from U.S. Appl. No. 14/210,068, 37 pages.
Corrected Notice of Allowability dated Sep. 6, 2016 from U.S. Appl. No. 14/210,068, 6 pages.
Requirement for Restriction/Election dated Jun. 11, 2015 from U.S. Appl. No. 13/912,078, 7 pages.
Response filed Jul. 16, 2015 to the Requirement for Restriction/Election dated Jun. 11, 2015 from U.S. Appl. No. 13/912,078, 7 pages.
Non-Final Office Action dated Aug. 3, 2015 from U.S. Appl. No. 13/912,078, 20 pages.
Response Filed Dec. 3, 2015 to the Non-Final Office Action dated Aug. 3, 2015 from U.S. Appl. No. 13/912,078, 12 pages.
Final Office Action dated Dec. 22, 2015 from U.S. Appl. No. 13/912,078, 15 pages.
After Final Consideration Program Request and Response filed Mar. 22, 2016 to the Final Office Action dated Dec. 22, 2015 from U.S. Appl. No. 13/912,078, 11 pages.
After Final Consideration Program Decision and Notice of Allowance dated Mar. 30, 2016 from U.S. Appl. No. 13/912,078, 18 pages.
Cuta, Frank M., "Hot Water Saver—Documenting the Correspondence Between Our Two Calculations of Energy Savings", Battelle Study Final Report, Apr. 22, 1985, 5 pages.
Skumatz et al., "Assessment of Savings and Operating Characteristics of the Hot Water Saver: Residential Test Analysis", Battelle Study, Dec. 31, 1983, 48 pages.
Notice of Incomplete Reply dated Dec. 1, 2011 from U.S. Appl. No. 13/276,635, 2 pages.
Response to the Notice of Incomplete Reply filed Dec. 5, 2011 from U.S. Appl. No. 13/276,635, 4 pages.
Requirement for Restriction/Election dated Jun. 3, 2014 from U.S. Appl. No. 13/276,635, 6 pages.
Response filed Jul. 10, 2014 to the Requirement for Restriction/Election dated Jun. 3, 2014 from U.S. Appl. No. 13/276,635, 9 pages.
Non-Final Office Action dated Aug. 13, 2014 from U.S. Appl. No. 13/276,635, 11 pages.
Response filed Nov. 12, 2014 to the Non-Final Office Action dated Aug. 13, 2014 from U.S. Appl. No. 13/276,635, 8 pages.
Non-Final Office Action dated Dec. 29, 2014 from U.S. Appl. No. 13/276,635, 6 pages.
Applicant Initiated Interview Summary dated Feb. 11, 2015 from U.S. Appl. No. 13/276,635, 3 pages.
Response filed Mar. 17, 2015 to the Non-Final Office Action dated Dec. 29, 2014 from U.S. Appl. No. 13/276,635, 9 pages.
Final Office Action dated Apr. 28, 2015 from U.S. Appl. No. 13/276,635, 10 pages.
Response filed Jul. 23, 2015 to the Final Office Action dated Apr. 28, 2015 from U.S. Appl. No. 13/276,635, 11 pages.
U.S. Appl. No. 61/384,206 titled "Automatic Hot Water Recovery Apparatus", filed Sep. 17, 2010 by inventor Spencer Kim Haws, 10 pages.
U.S. Appl. No. 61/405,359 titled "Hot Water Recovery", filed Oct. 21, 2010 by inventor Spencer Kim Haws, 31 pages.
U.S. Appl. No. 61/637,173 titled "Hot Water Recovery," filed Apr. 23, 2012 by inventor Spencer Kim Haws, 118 pages.
U.S. Appl. No. 61/657,477 titled "Hot Water Recovery Apparatus," filed Jun. 8, 2012 by inventor Spencer Kim Haws, 19 pages.
U.S. Appl. No. 62/019,332 titled "Hot Water Recovery Apparatus," filed Jun. 30, 2014 by inventor Spencer Kim Haws, 110 pages.
U.S. Appl. No. 61/878,563 titled "Hot Water Recovery," filed Sep. 16, 2013 by inventor Spencer Kim Haws, 208 pages.
Response filed Oct. 25, 2017 to the Non-Final Office Action dated Aug. 1, 2017 from U.S. Appl. No. 14/851,451, 7 pages.
Final Office Action dated Nov. 13, 2017 from U.S. Appl. No. 14/851,451, 12 pages.
Response filed Mar. 9, 2018 from U.S. Appl. No. 14/851,451, 6 pages.
Non-Final Office Action dated Mar. 29, 2018 from U.S. Appl. No. 14/851,451, 11 pages.
Non-Final Office Action dated Dec. 13, 2017 from U.S. Appl. No. 14/752,612, 57 pages.
Response filed Apr. 13, 2018 to Non-Final Office Action dated Dec. 13, 2017 from U.S. Appl. No. 14/752,612, 11 pages.
Final Office Action dated Jul. 25, 2018 from U.S. Appl. No. 14/752,612, 15 pages.

\* cited by examiner

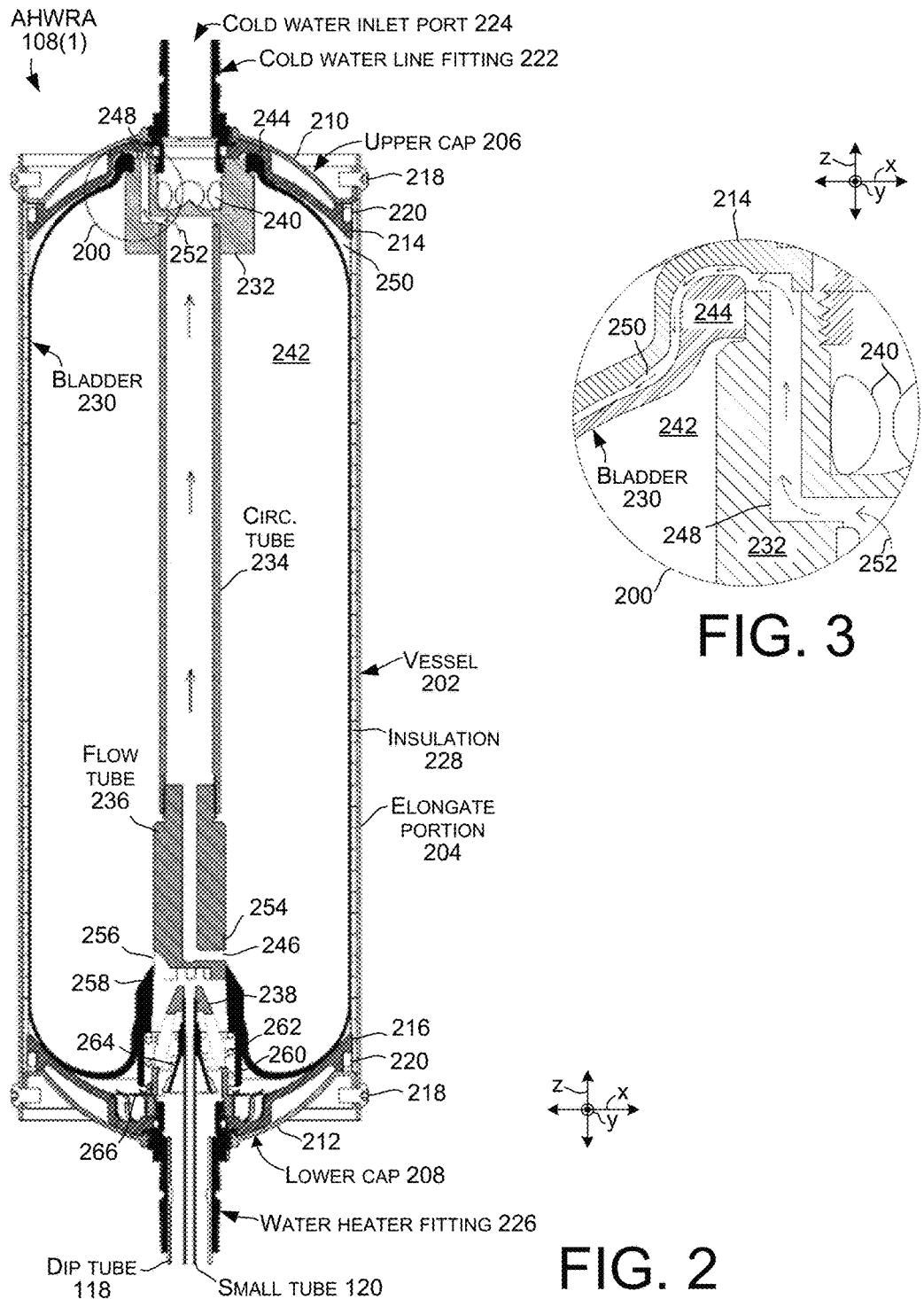

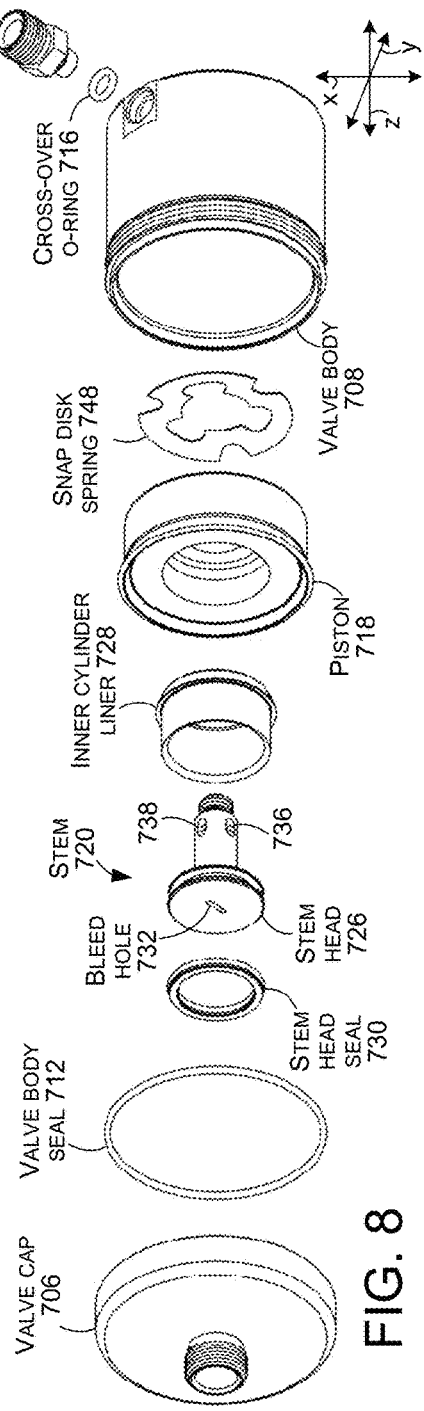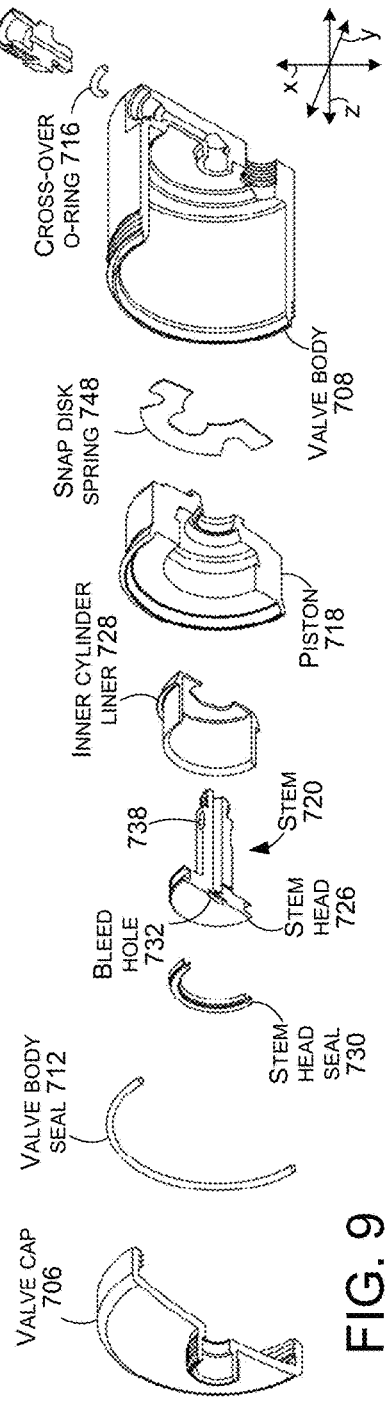

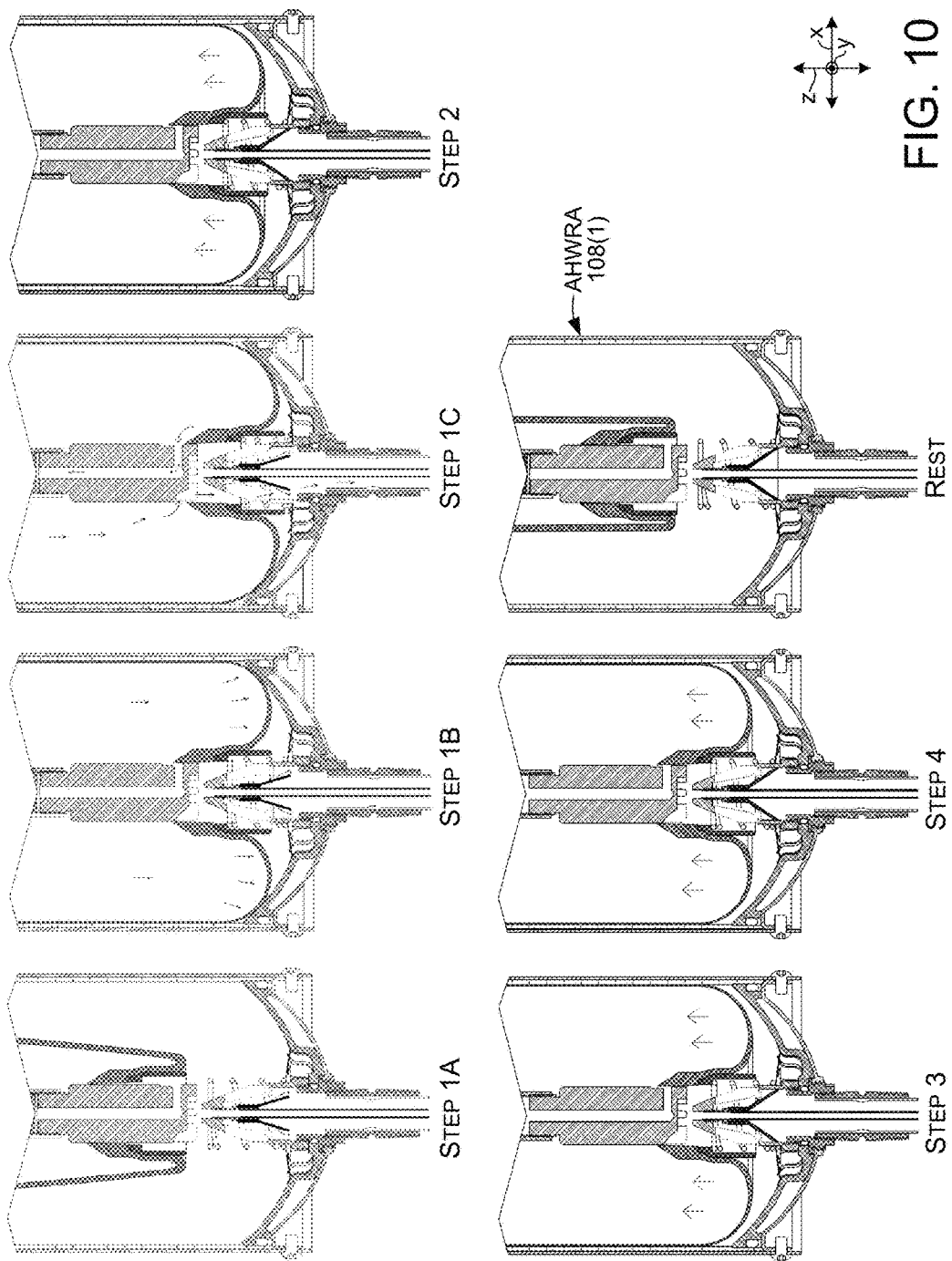

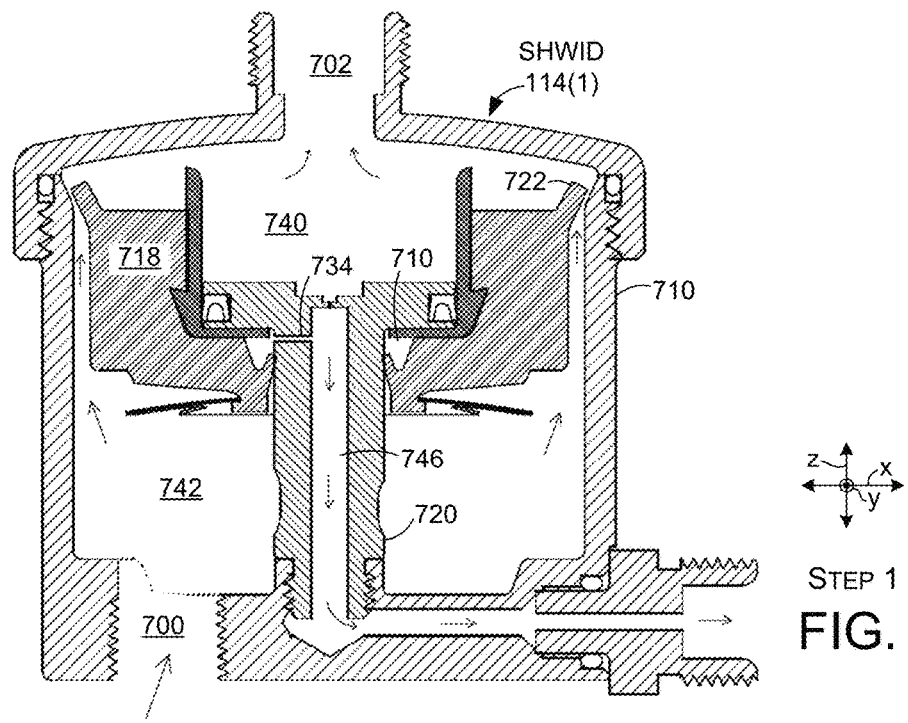
STEP 1
FIG. 12
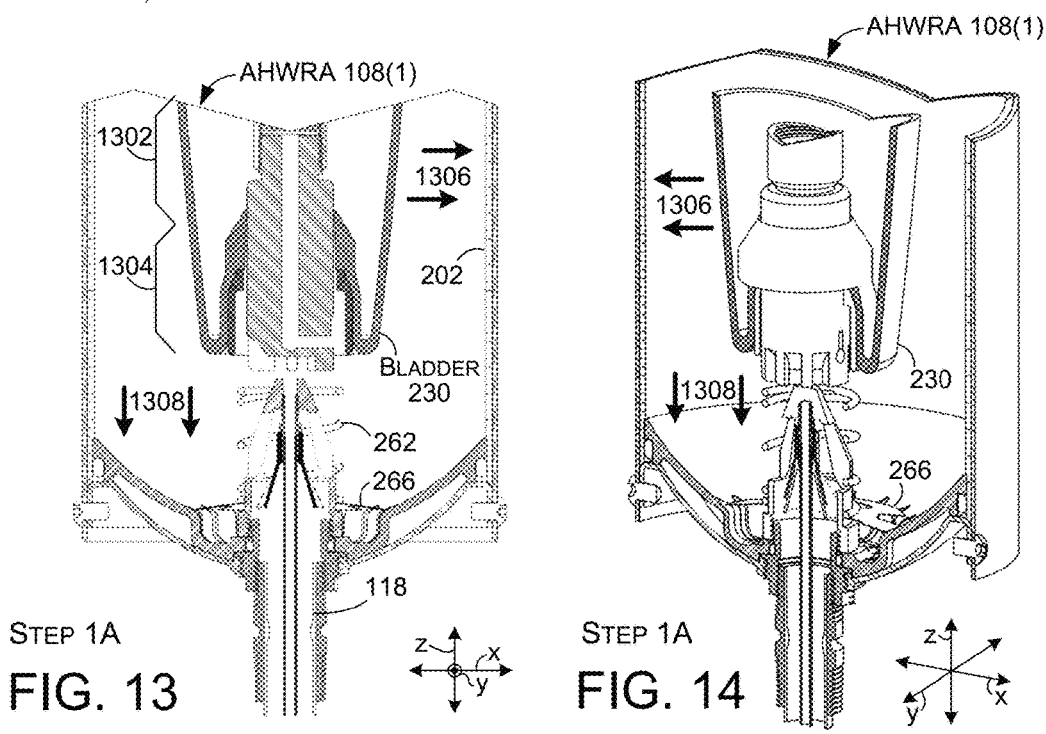
STEP 1A
FIG. 13
STEP 1A
FIG. 14

STEP 1B

STEP 1C

STEP 1C

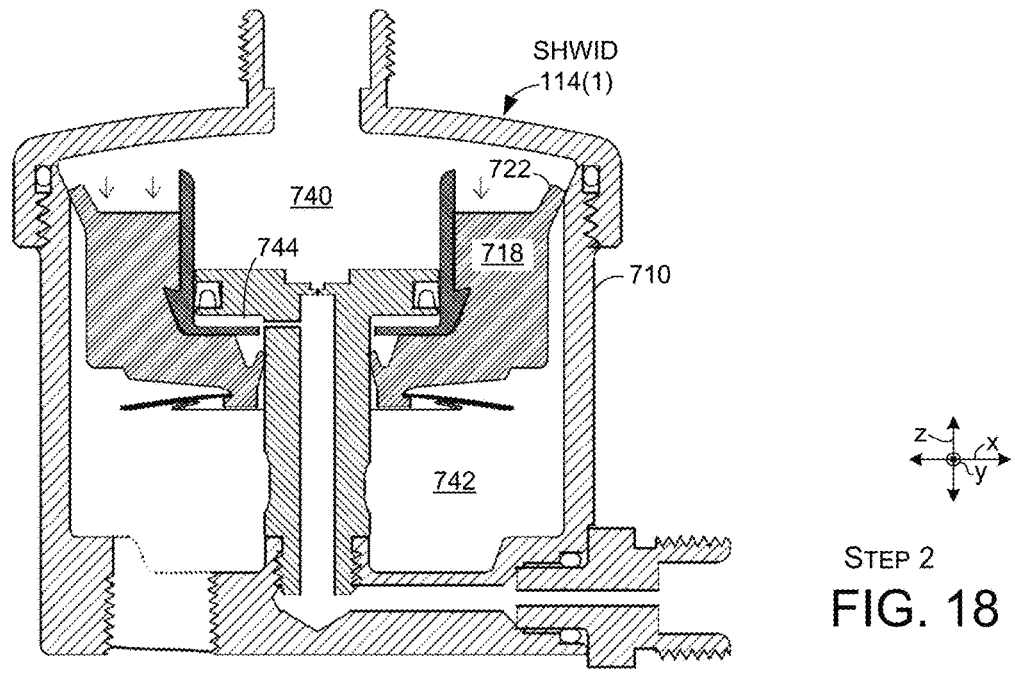
STEP 2
FIG. 18
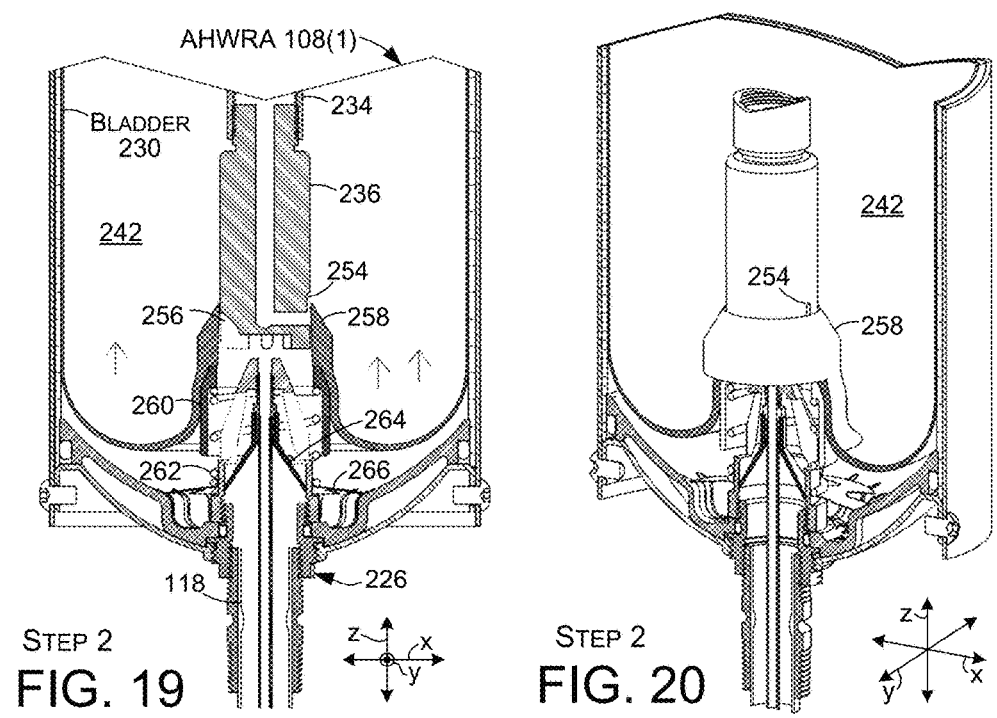
STEP 2
FIG. 19
STEP 2
FIG. 20

STEP 3

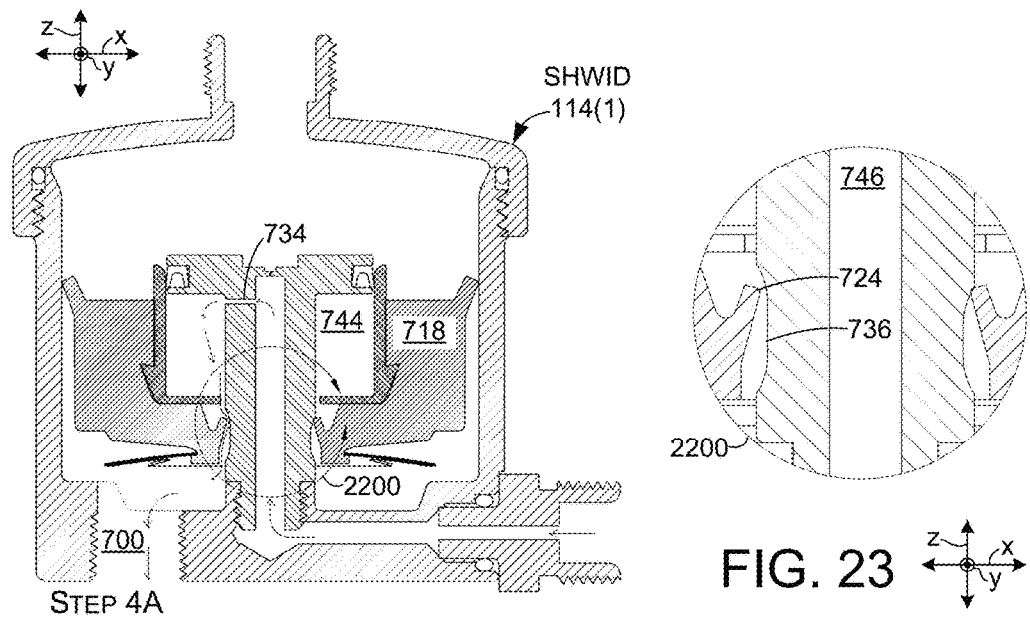
STEP 4A
FIG. 22
FIG. 23
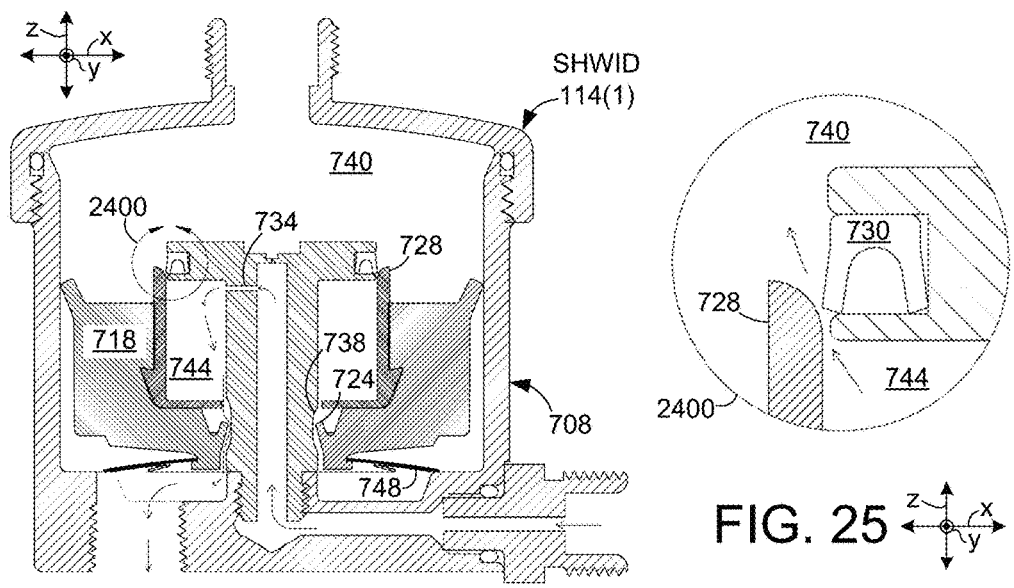
STEP 4B (AND REST A)
FIG. 24
FIG. 25

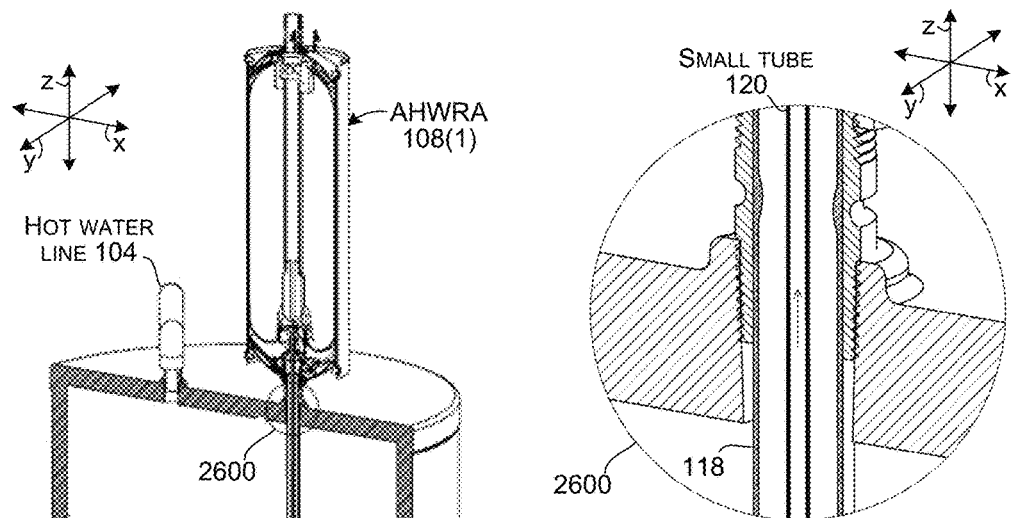
STEP 4
FIG. 27
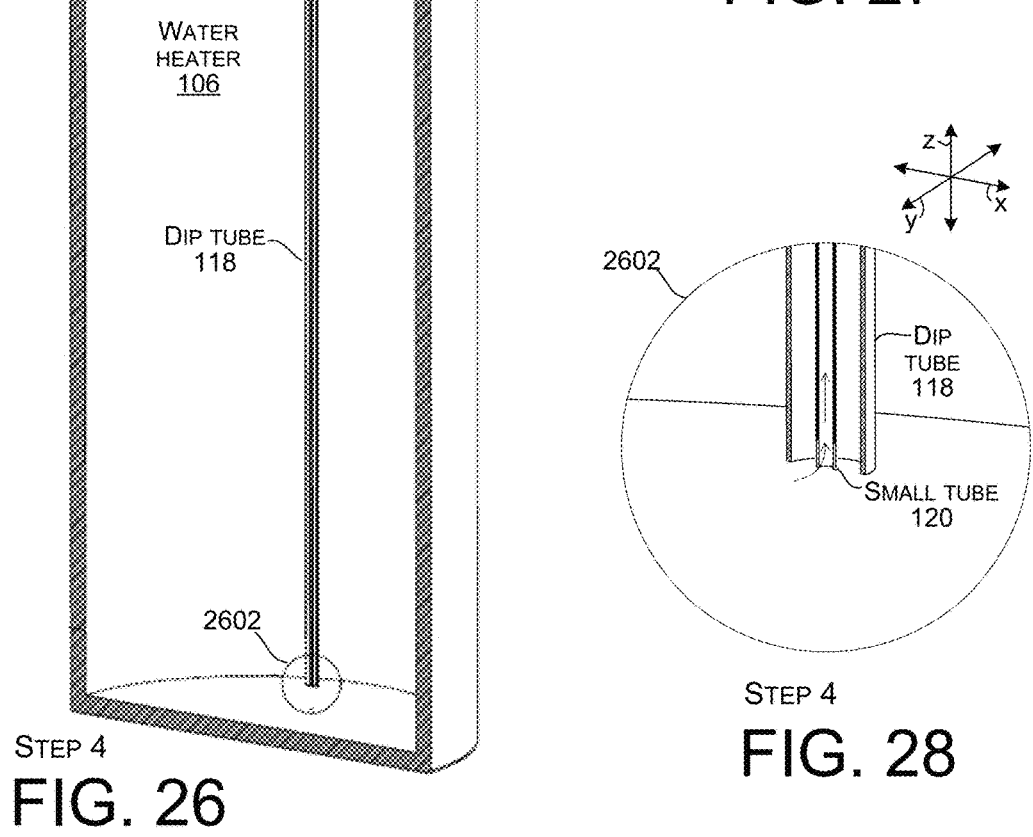
STEP 4
FIG. 26
STEP 4
FIG. 28

STEP 4

REST

STEP 5 (AND REST B)

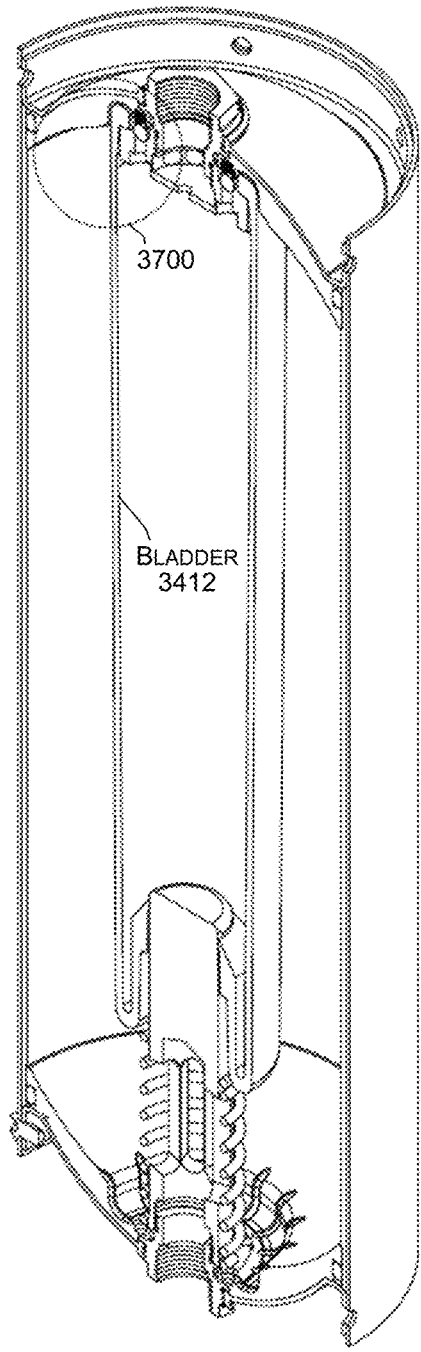
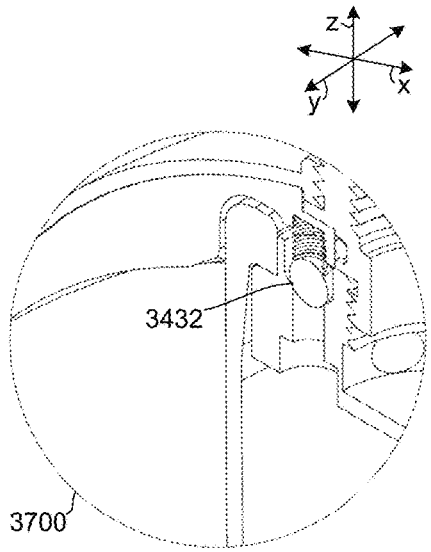
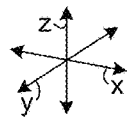
FIG. 38
FIG. 37

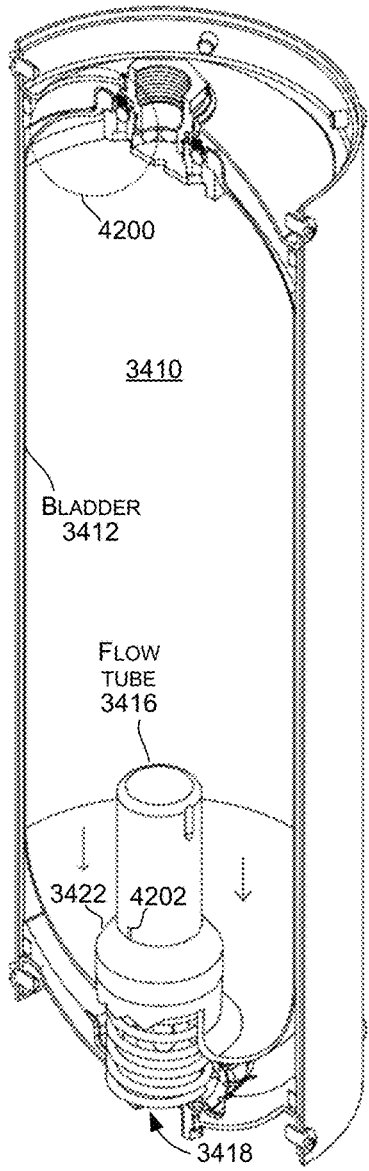
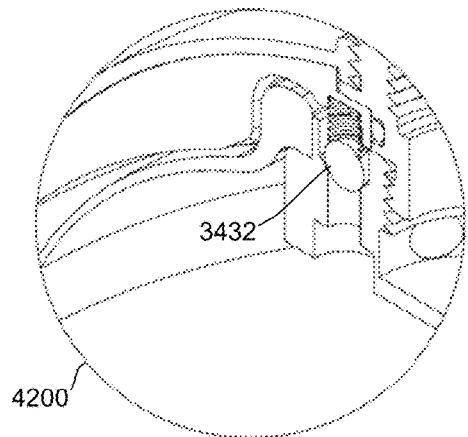
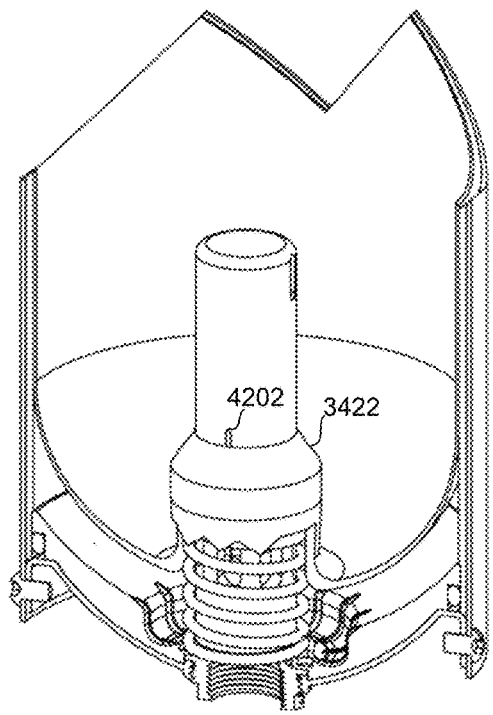
FIG. 42
FIG. 43
FIG. 44

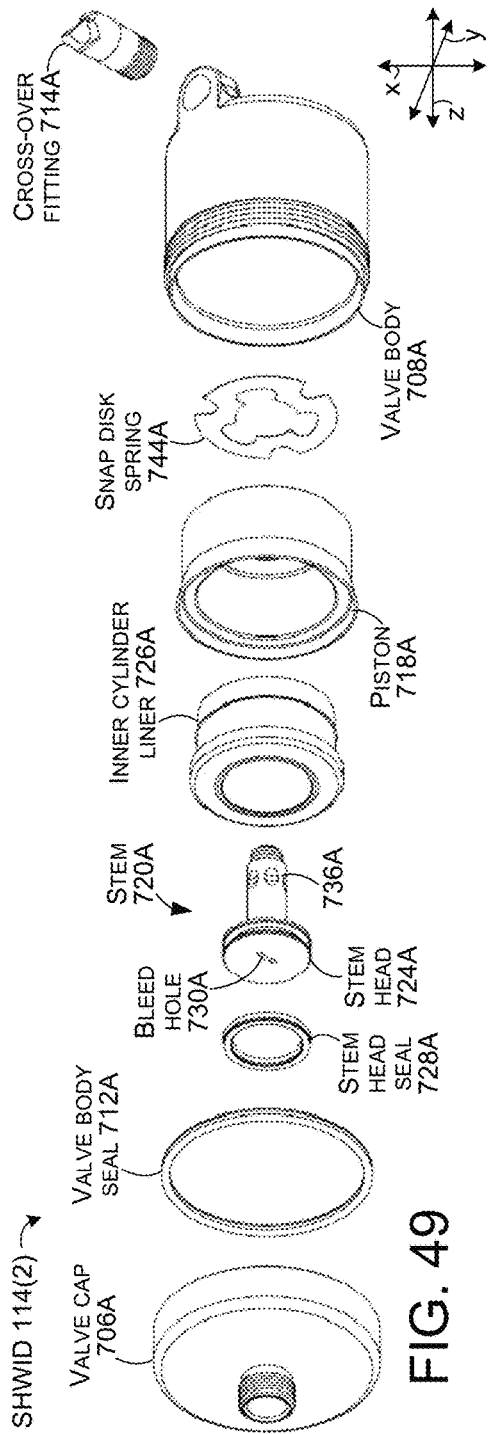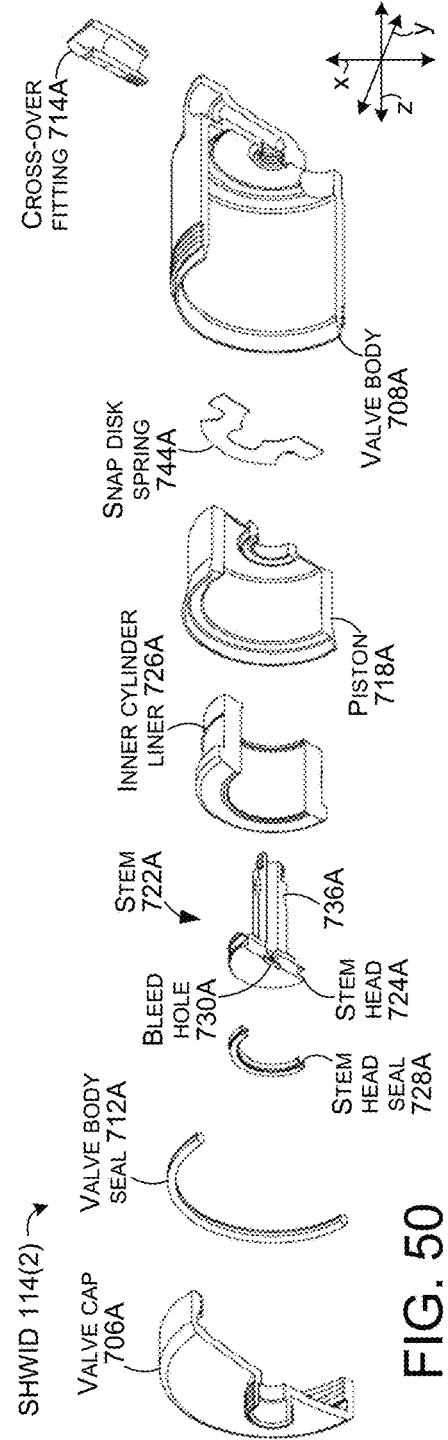
FIG. 49
FIG. 50

HOT WATER RECOVERY

PRIORITY

This patent application is a Divisional of and claims priority from U.S. Utility Application No. 14/210,068 filed on Mar. 13, 2014 which is a non-provisional application that claims priority from U.S. Provisional Application No. 61/878,563, filed on Sep. 16, 2013. U.S. Utility Application No. 14/210,068 is a Continuation-In-Part and claims priority from U.S. Utility Application No. 13/864,943, filed on Apr. 17, 2013, and claims priority from U.S. Provisional Application No. 61/782,024, filed Mar. 14, 2013, and U.S. Provisional Application No. 61/637,173 filed on Apr. 23, 2012, U.S. Utility Application No. 14/210,068 is also a Continuation-In-Part and claims priority from U.S. Utility Application No. 13/276,635, filed on Oct. 19, 2011, and claims priority from U.S, Provisional Application No. 61/405,359 filed on Oct. 21, 2010. Each of these applications are incorporated by reference in their entirety.

FIELD OF THE INVENTION

The patent relates to energy savings, especially energy savings associated with hot water and hot water heaters.

BRIEF DESCRIPTION OF THE DRAWINGS

The accompanying drawings illustrate implementations of the concepts conveyed in the present patent. Features of the illustrated implementations can be more readily understood by reference to the following description taken in conjunction with the accompanying drawings.

FIGS. 2-6, 10, 13-17, 19-20, 29-30, and 32-47 show example automatic hot water recovery apparatuses in accordance with some implementations.

FIGS. 7-9, 11-12, 18, 21-25, 31, and 48-59 show example selective hot water isolation devices in accordance with some implementations.

FIGS. 26-28 show sectional, perspective views of hot water tanks and automatic hot water recovery apparatuses in accordance with some implementations.

DETAILED DESCRIPTION

Overview

Figure 1:
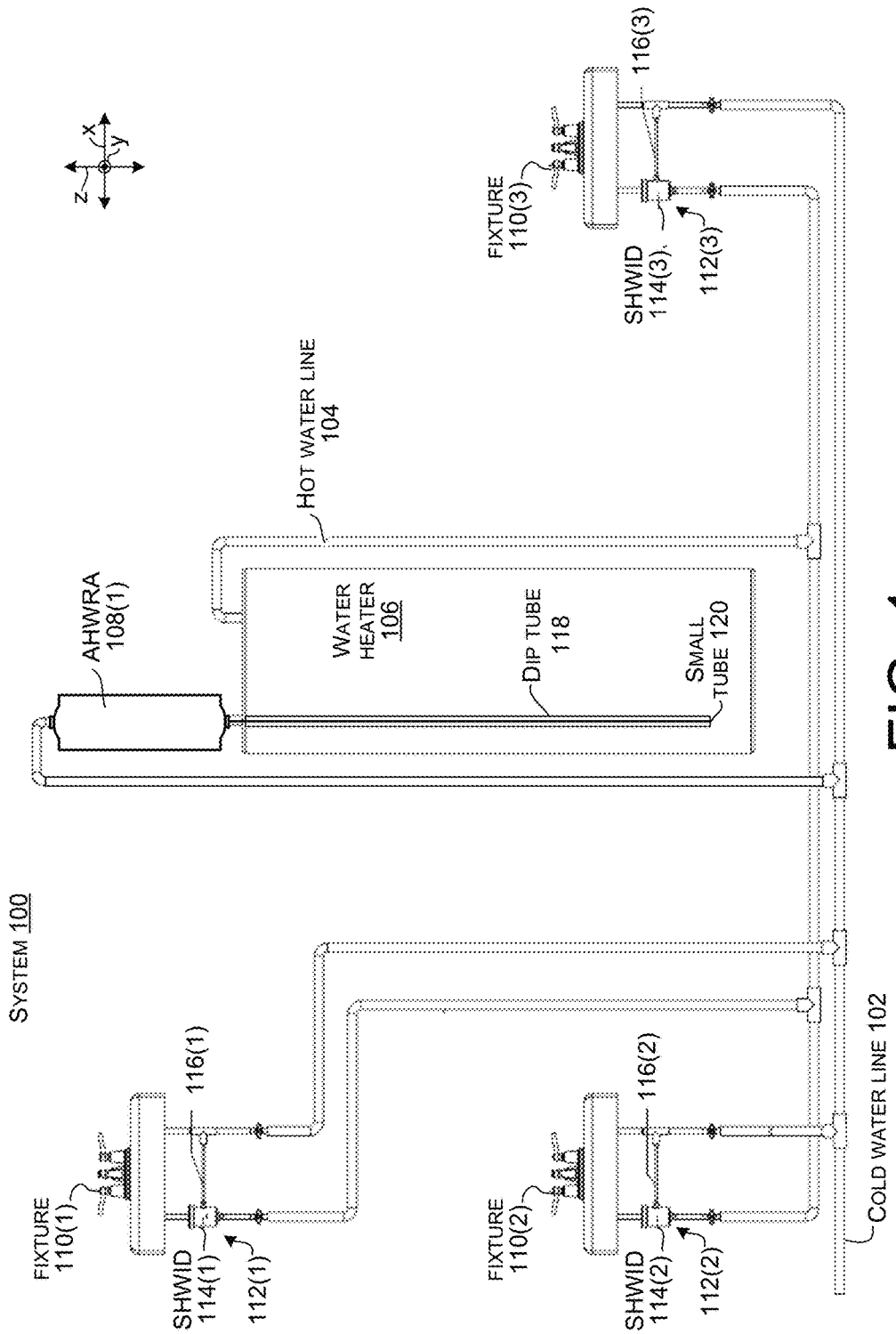
FIG. 1 shows an example system in which the present hot water recovery concepts can be applied in accordance with some implementations.

The present description relates to saving energy by recovering hot water so that energy in the hot water is not lost to the environment. One aspect of this energy savings is an automatic hot water recovery apparatus. Another aspect is a selective hot water isolation device.

In one scenario, the automatic hot water recovery apparatus can be installed in a water system to reduce energy consumption. The water system can include an unheated supply (cold water). Some of the cold water can be supplied to a 'hot water tank' or 'water heater'. An end use device or fixture, such as a faucet, can be supplied with a hot water line from the water heater and a cold water line from the unheated supply. A one way cross-over device can be installed proximate the end use device so that in some circumstances water can flow from the cold water line to the hot water line, but not vice versa.

The automatic hot water recovery apparatus can be integrated into the water supply system proximate to the water heater. The automatic hot water recovery apparatus can receive cold water at a cold water inlet port from the supply and emit water at an outlet port for receipt by the water heater. The automatic hot water recovery apparatus can decrease energy use by reducing energy loss from hot water that is 'stranded' between the hot water heater and the end use device or fixture. Stated another way, after a user runs the hot water at the fixture, the automatic hot water recovery apparatus can cause hot water in the hot water line to be drawn back into the hot water heater and thereby reduce heat loss.

In one implementation, under a first set of conditions, such as when a user opens the hot and cold taps on the fixture, an elastomeric bladder of the automatic hot water recovery apparatus is stretched from a first configuration to a second configuration by water movement from the water inlet towards the water outlet of the automatic hot water recovery apparatus. Under a second set of conditions, such as when the user closes the taps, the elastic or resilient nature of the elastomeric bladder to return to its original first configuration can reverse the flow and draw water back into the automatic hot water recovery apparatus from its water outlet (e.g., from the water heater). This action can in turn draw hot water from the hot water pipe back into the water heater.

Another aspect of the discussion relates to novel one way cross-over devices termed 'selective hot water isolation devices'. As mentioned above, hot water recovery systems can connect hot and cold water lines at a distant point of use from the water heater using a one way cross-over device. After hot water is used, cold water flows through this cross-over connection into the hot water pipe, slowly filling it with cold water as the stranded hot water is drawn back into the water heater.

The amount of energy that these systems can recover is considerable. However, existing systems have some limitations. First, when only hot water is being drawn, cold water is able to flow into the hot water line, slightly compromising the temperature of the hot water. The temperature is reduced not only at the fixture where the crossover is located but at all of the hot water fixtures in the system. This occurrence can have an especially deleterious effect on automatic dishwashers and/or automatic clothes washing machines that rely on high water temperatures to clean effectively. Secondly, the existing systems can only recover the stranded hot water in one pipe. For example, in nearly all existing systems the hot water line has a tee (or "T") near the water heater, sending hot water to different parts of the system. Suppose the kitchen is 30 feet in one direction and a bathroom is 25 feet in another direction and another bathroom or laundry room is some distance in yet another direction. The existing recovery systems can only return the stranded hot water sent to one of those outlets.

The present hot water recovery concepts can reduce and/or eliminate inadvertent cold water cross-over through the use of the selective hot water isolation devices. These hot water recovery concepts can also be applied to end use devices (e.g., fixtures, end use fixtures) in a system such that the cold water cross-over can occur relative to an individual fixture through which hot water (or mixed hot and cold water) is actually flowing (or has recently flowed). So for example, where a system includes multiple fixtures, when a user uses a particular fixture, cold water cross-over can occur proximate to that fixture to recover hot water in pipes supplying that fixture while cold water cross-over connections at the unused fixtures can be reduced or avoided. Alternatively or additionally, cold water cross-over may be reduced or eliminated during the actual use so that a higher hot water temperature is maintained. In such a case, cold water cross-over may be delayed until hot water flow stops and/or until a period of time after hot water flow stops. Also, the cold water cross-over may be shut off.

System Example

FIG. 1 shows a system 100 to which the present hot water recovery concepts can be applied. Of course, system 100 is provided for purposes of explanation and the present concepts can be applied to other systems. System 100 includes a cold water line 102, a hot water line 104, water heater 106, and an automatic hot water recovery apparatus (AHWRA) 108(1). The elastomeric AHWRA is positioned in fluid flowing relation to the cold water line 102 proximate to water heater 106.

System 100 also includes end use devices or fixtures 110(1), 110(2), and 110(3), manifest as three faucets. Of course, other types of end use devices, such as dish washers and/or clothes washers can be employed. From one perspective a fixture can be thought of as any device that offers the ability to control the flow of hot and cold water. A cold water cross-over device (e.g., connection, x-connection) 112 can be located proximate to one or more of the fixtures. In this example cold water cross-over devices are positioned proximate to each of the fixtures. Specifically, cold water cross-over device 112(1) is positioned proximate to fixture 110(1), cold water cross-over device 112(2) is positioned proximate to fixture 110(2), and cold water cross-over device 112(3) is positioned proximate to fixture 110(3). The cold water cross-over connections 112 can function to allow cold water to flow to the hot water line, but block water from the hot water line flowing to the cold water line. Scenarios in which cold water could flow from the cold water line 102 to the hot water line 104 are described below.

In the case illustrated in FIG. 1, the cold water cross-over devices 112 are manifest as selective hot water isolation devices (SHWID) 114(1), 114(2), and 114(3) and corresponding cold water cross-over lines 116(1), 116(2), and 116(3), respectively. The selective hot water isolation devices 114 are positioned in fluid controlling relation between the cold water line 102 and the hot water line 104 proximate to the fixtures 110 such that the selective hot water isolation devices can selectively allow water to flow from the cold water line into the cold water cross-over line 116 through the selective hot water isolation device 114 and into the hot water line. For instance, under a specific set of conditions, selective hot water isolation device 114(1) can selectively allow water to flow from cold water line 102 into the cold water cross-over line 116(1) through the selective hot water isolation device 114(1) and into the hot water line 104. These conditions can include a first condition where hot water flows through the selective hot water isolation device for use at the corresponding fixture 110(1). A second condition can be the cessation of the hot water flow through the selective hot water isolation device after hot water has been used at the corresponding fixture 110(1).

Briefly, in operation, if hot water is drawn at fixture 110(1), for instance, cold water can be allowed to flow to the hot water line 104 by selective hot water isolation device 114(1). However, cold water can be prevented from entering the hot water line 104 through selective hot water isolation devices 114(2) and 114(3). Similarly, if hot water is drawn at fixture 110(2) cold water can be allowed to flow to the hot water line 104 by selective hot water isolation device 114(2) but cold water can be prevented from entering the hot water line 104 through hot water isolation devices 114(1) and 114(3). Further functioning of the selective hot water isolation devices within the system is described below relative to FIGS. 10 through 31 and FIGS. 48 through 59.

Also shown in the example in FIG. 1 are dip tube 118 and small tube 120. Dip tube 118 extends from AHWRA 108(1) downward into the interior of water heater 106. Small tube 120 is positioned inside the dip tube. The small tube is in fluid flowing relation with the AHWRA and the water heater. Further description and functioning of the dip tube and the small tube is provided below relative to FIGS. 28 through 30.

First Automatic Hot Water Recovery Apparatus Example

Figure 4:
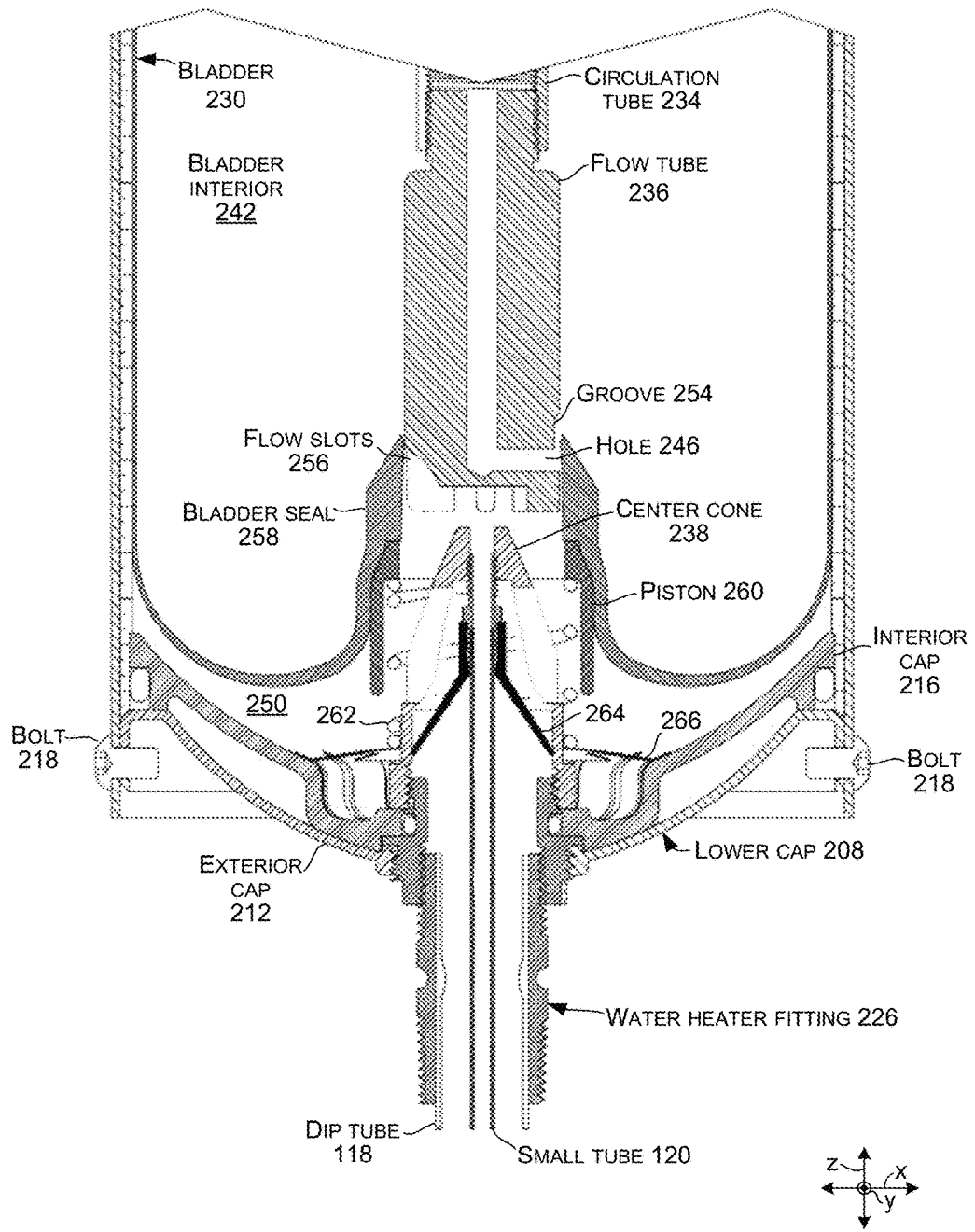
Figure 5:
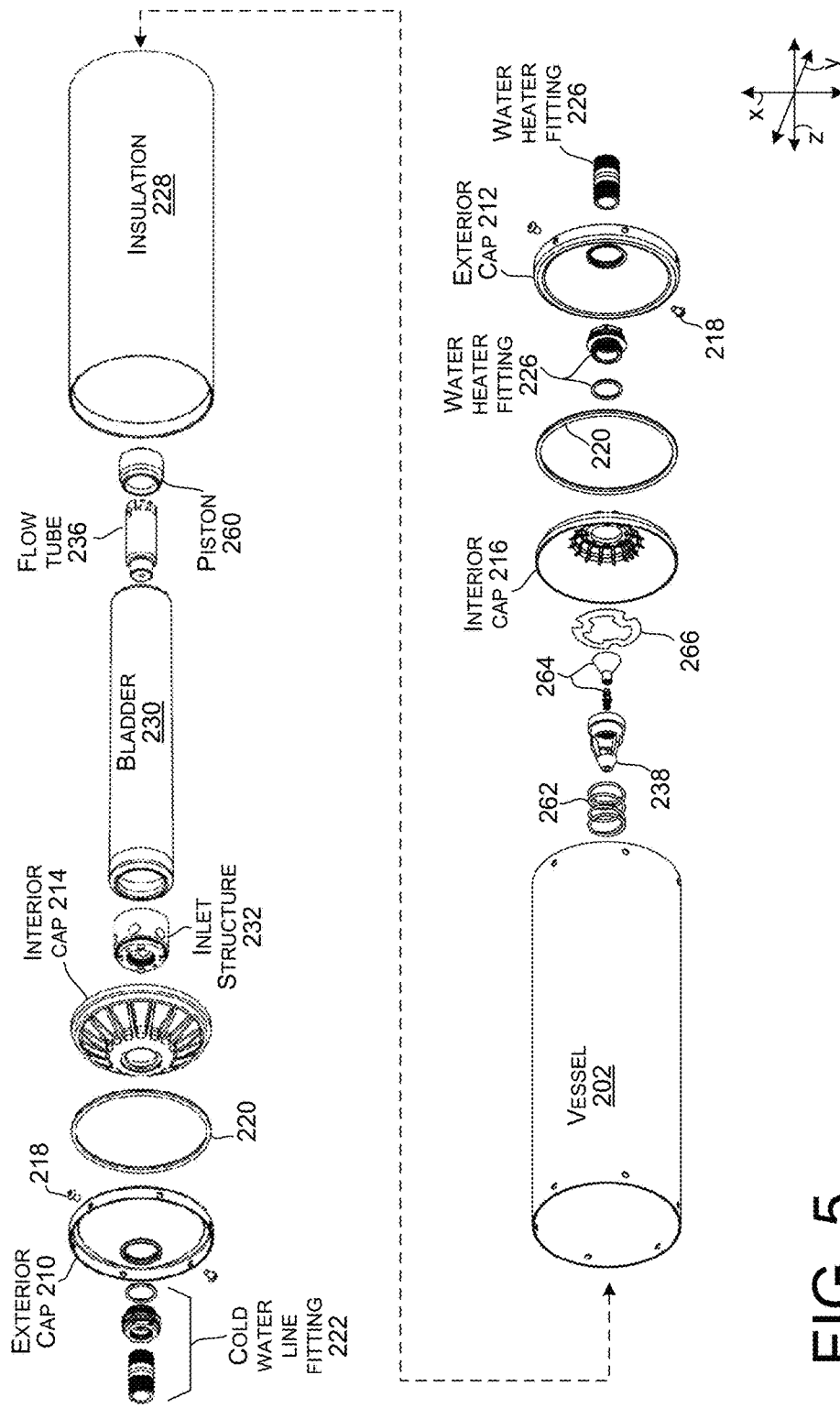
Figure 6:
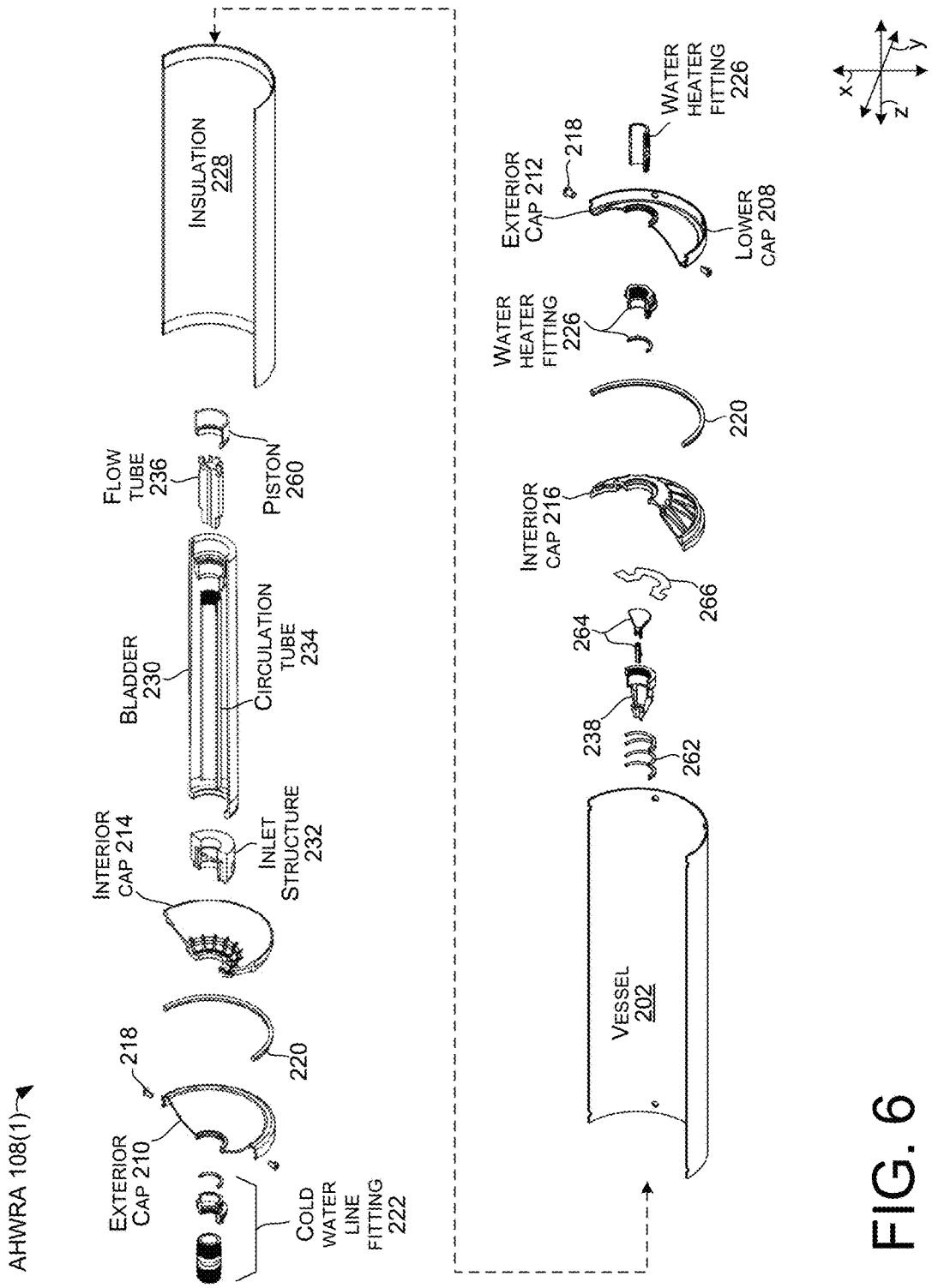

FIGS. 2 through 6 collectively illustrate example automatic hot water recovery apparatus 108(1) in more detail. Since the reader may have difficulty visualizing all of the components of automatic hot water recovery apparatus 108(1) from a single view, several views are offered concurrently. FIG. 2 is a sectional view of the automatic hot water recovery apparatus. FIG. 3 is a close-up view of portion 200 of FIG. 2. FIG. 4 is a close-up, sectional view of a lower end of automatic hot water recovery apparatus 108(1). FIG. 5 is an exploded, perspective view and FIG. 6 is an exploded, cut-away perspective view of structures of the automatic hot water recovery apparatus.

In the example illustrated in FIGS. 2 through 6, automatic hot water recovery apparatus 108(1) includes a vessel 202 (e.g., barrel). The vessel can include an elongate portion 204 and end caps, e.g., upper cap 206, and lower cap 208. In some implementations, the end caps can be configured with one or multiple pieces, and can be secured to the elongate portion depending on their configuration. In this example, the upper cap 206 and lower cap 208 each include exterior caps 210 and 212 and interior caps 214 and 216 (e.g., cap liners), respectively. The exterior caps can be secured to the elongate portion 204 with screws 218, and the interior caps can be sealed against the elongate portion with seals 220. The end caps and the elongate portion can be securable to one another and/or sealed by other methods, either in a fixed or removable fashion.

The upper cap 206 can be secured by one or more threaded connections (or otherwise secured) to a cold water line fitting 222 (e.g., nipple and/or port adapter), which can define a cold water inlet port 224. The cold water line fitting 222 can also be secured by a threaded connection (or otherwise secured) to cold water line 102 (see FIG. 1). The lower cap 208 can be secured by one or more threaded connections (or otherwise secured) to a water heater fitting 226 (e.g., nipple and/or port adapter). Note that the cold water line fitting and/or the water heater fitting can be configured with one or multiple pieces, and can be secured to the end caps with or without seals. In the case shown in FIGS. 2 through 6, the cold water line fitting and the water heater fitting each include two pieces and are sealed against the end caps with a seal (shown but not designated). The dip tube 118 can be positioned within the water heater fitting 226, and the small tube 120 can be positioned within the dip tube. Additionally, the vessel 202 can be surrounded by insulation 228 (e.g., barrel liner) as feasible.

The automatic hot water recovery apparatus 108(1) can also include a bladder 230, an inlet structure 232 (e.g., bladder clamp), a circulation tube 234, a flow tube 236 (e.g., upper flow tube), and a center cone 238 (e.g., lower flow tube). The bladder 230 can be elastomeric in nature to aid the operation of the automatic hot water recovery apparatus as will be described below.

The inlet structure 232 can have inlet holes 240 such that cold water can pass from cold water inlet port 224 through the inlet structure and into bladder interior 242. The bladder can have a bladder top 244 that is sealed against the inlet structure. In this case, the bladder top is bulbous and is received in a corresponding annular cavity of the inlet structure (shown but not designated). The inlet structure 232, circulation tube 234, and flow tube 236 can be connected in series, by threaded connections or other sealed connections. The flow tube 236 can define a fluid passageway from a hole 246 to the circulation tube such that water can flow from the bladder interior 242 into the circulation tube. Further, the inlet structure can have a duct 248 such that water can flow from inside the circulation tube to a bladder exterior 250, as indicated by arrows 252 (best viewed in FIG. 3). As shown in FIG. 5, the interior cap 214 can have one or more grooves (e.g., indentations). The duct 248 of the inlet structure can be aligned with at least one groove such that a fluid passageway is formed from the inside of the circulation tube 234 to the bladder exterior 250. In other implementations, the fluid passageway could be formed in part by one or more indentations or grooves in an external surface of the bladder, or with raised areas of the external surface of the bladder, such as ribs or protuberances (e.g., bumps). Alternatively or additionally, an interior surface of the interior cap can have raised areas, such as ribs or bumps.

Structures in the lower end of automatic hot water recovery apparatus 108(1) will now be described in relation to FIGS. 2 and 4. Although shown in FIG. 2, these structures are best viewed in FIG. 4. Note that bladder 230 is in a slightly different position in FIG. 2 as compared to FIG. 4. For example, in FIG. 2 the bladder is touching the interior 216 of the lower cap 208, but these parts are not touching in FIG. 4. This difference will be described further in relation to the operation of the automatic hot water recovery apparatus below. As shown in FIGS. 2 and 4, in addition to hole 246, flow tube 236 can have flow tube groove 254 and flow slots 256. Bladder 230 can include bladder seal 258. The automatic hot water recovery apparatus can also include piston 260 (e.g., spring sleeve), bladder spring 262, check valve 264, and snap disk spring 266 (e.g., disk spring). The check valve 264 can include one or multiple pieces, such as the check valve and a check valve barb (shown but not designated). In this case, the bladder seal is positioned on top of the piston 260. The elastic nature of the bladder tends to seal the bladder against the piston and hold the lower end of the bladder in place. Fluid flow relationships between structures in the lower end of automatic hot water recovery apparatus 108(1) are determined by the operation of the automatic hot water recovery apparatus, and influenced by the operation of other components of system 100, e.g., selective hot water isolation device 114(1) (see FIG. 1). These fluid relationships and operations will be described below relative to FIGS. 10 through 31.

First Selective Hot Water Isolation Device Example

Figure 7:
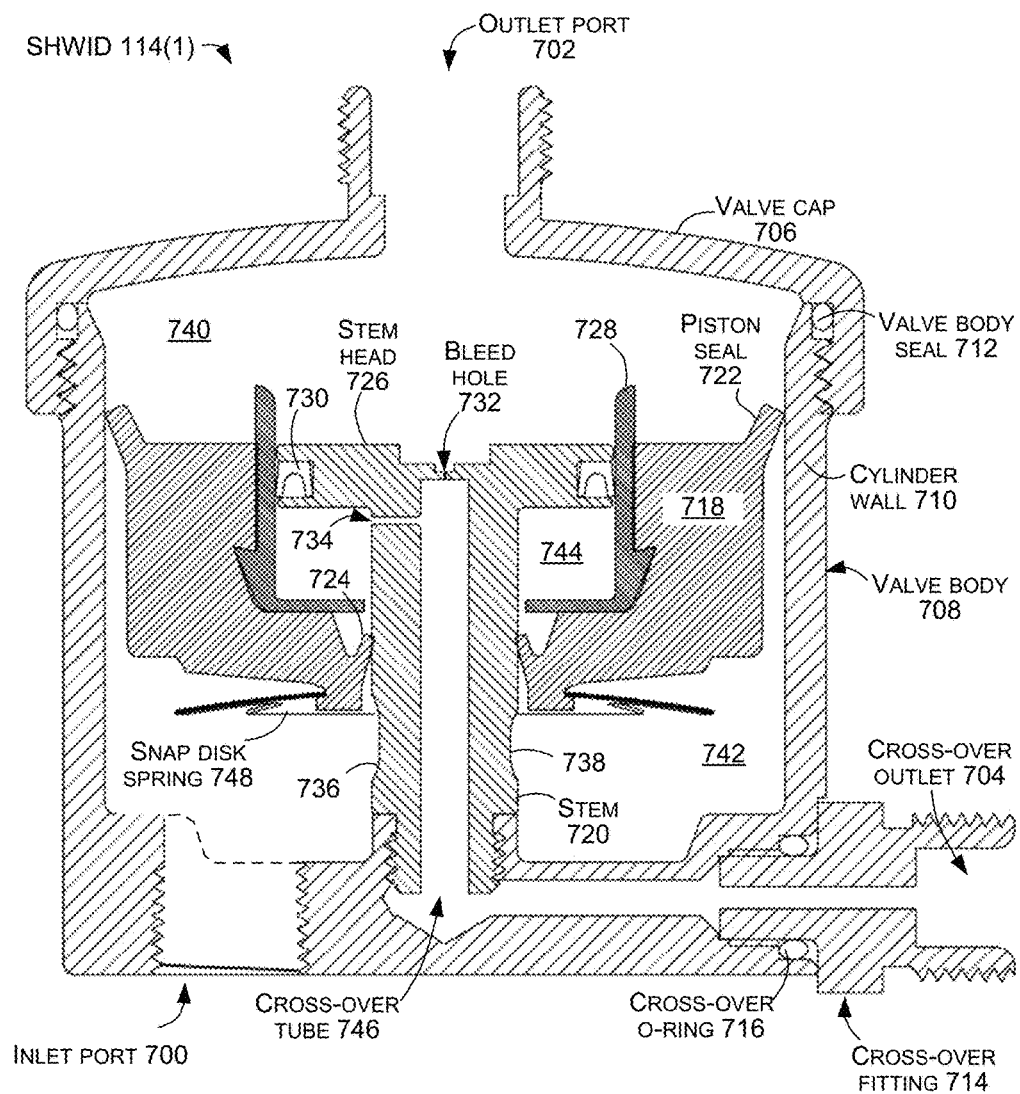

FIGS. 7 through 9 collectively illustrate example selective hot water isolation device 114(1) in more detail. Since the reader may have difficulty visualizing all of the components of selective hot water isolation device 114(1) from a single view, multiple views are offered concurrently. FIG. 7 is a sectional view of the selective hot water isolation device. FIG. 8 is an exploded, perspective view of structures of the selective hot water isolation device. FIG. 9 is a cut-away, exploded, perspective view of structures of the selective hot water isolation device.

In the case illustrated in FIG. 7, the selective hot water isolation device 114(1) extends from a water heater end (e.g., inlet port) 700 to a fixture end (e.g., outlet port) 702 and couples to a cold water cross-over line (116(1), FIG. 1) via cross-over outlet 704. The inlet port, outlet port, and cross-over outlet can be threaded or otherwise be securable to their respective water lines. For example, inlet port 700 can be threaded to receive a cold water line (102, FIG. 1). This selective hot water isolation device can include a valve cap 706 and a valve body 708. The valve body includes a cylinder wall 710. The valve cap and valve body can be threaded or otherwise be securable to one another, either in a fixed or removable fashion. A valve body seal 712 is positioned between the valve cap and the valve body. The valve cap 706 can have an inside diameter that corresponds to an outside diameter of the cylinder wall 710 such that the valve body seal 712 can create a seal therebetween. This selective hot water isolation device also includes a cross-over fitting 714. A cross-over o-ring 716 is positioned between the valve body 708 and the cross-over fitting 714. The valve body 708 proximate the cross-over fitting 714 can have an inside diameter that corresponds to an outside diameter of the cross-over fitting such that the cross-over o-ring can create a seal therebetween.

As shown in the example in FIG. 7, a piston 718 is positioned in the valve body 708. A stem 720 is nested in the piston 718. The piston includes a piston seal 722 proximate the cylinder wall 710 and a lower piston seal 724 proximate the stem 720. The stem includes a stem head 726. An inner cylinder liner 728 is nested between the stem head 726 and the piston 718, and a stem head seal 730 is positioned between the stem head 726 and the inner cylinder liner 728. The dimensions of the piston, stem head, and inner cylinder liner can be such that the stem head seal helps create a seal therebetween. The stem 720 can also include a bleed hole 732, a metering hole 734, a large stem groove 736, and a small stem groove 738.

In this case, the valve body 708, valve cap 706, piston 718, and inner cylinder liner 728 collectively form an outer cylinder upper cavity 740, an outer cylinder lower cavity 742, and an inner cylinder cavity 744. The outer cylinder lower cavity 742 and the inner cylinder cavity 744 extend radially around the stem 720 in the x and y directions with respect to the x-y-z reference axes. The stem also has an inner cavity (cross-over tube) 746. The inlet port 700 is in fluid flowing relation with the outer cylinder lower cavity 742. The outlet port 702 is in fluid flowing relation with the outer cylinder upper cavity 740. The cross-over outlet 704 is in fluid flowing relation with the cross-over tube 746. Bleed hole 732 allows fluid to pass between the cross-over tube and the outer cylinder upper cavity 740. Metering hole 734 allows fluid to pass between the cross-over tube and the inner cylinder cavity 744.

As shown in the example in FIG. 7, selective hot water isolation device 114(1) also includes snap disk spring 748. In this case, the piston 718 can move up and down the z reference axis with respect to the stem 720. The position of the piston, the dimensions and positioning of the structures introduced above, and the action of the snap disk spring collectively determine further fluid flowing relations within the selective hot water isolation device 114(1) and the system in general. These structures and fluid relations will be further described below, relative to FIGS. 10 through 31.

Operational Description of Hot Water Recovery

Hot water recovery concepts will now be described in relation to FIGS. 10 through 31. In this example, the functions of automatic hot water recovery apparatus 108(1) and selective hot water isolation device 114(1) in system 100 will be discussed (see FIG. 1). In FIGS. 10 through 31, not all elements are labeled in each FIG. to avoid clutter on the drawing page. For reference, the structures of automatic hot water recovery apparatus 108(1) were previously described in relation to FIGS. 2 through 6. The structures of selective hot water isolation device 114(1) were previously described in relation to FIGS. 7 through 9.

Figure 11:
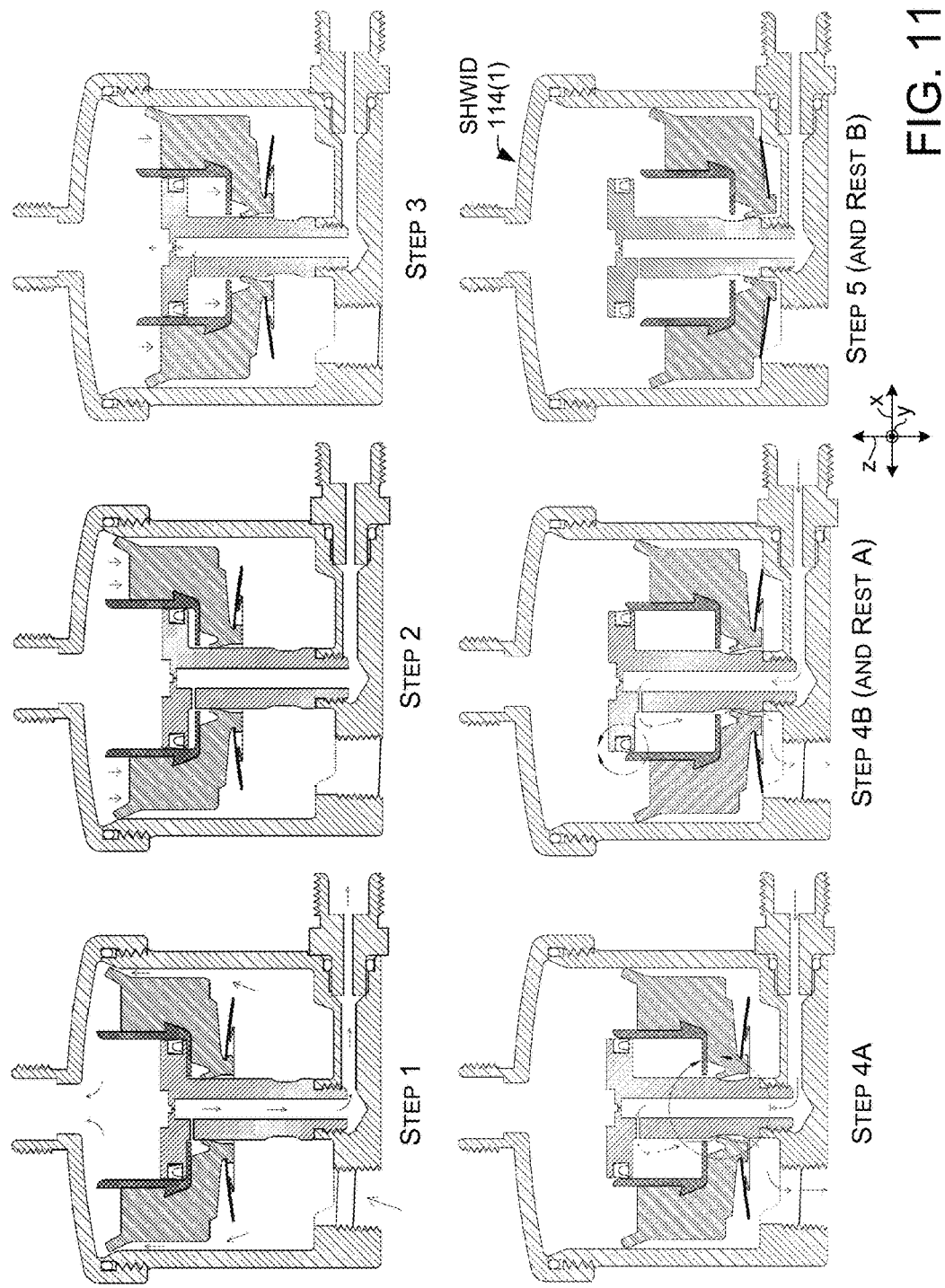

The functions of automatic hot water recovery apparatus 108(1) and selective hot water isolation device 114(1) can be divided into a series of coordinating operational steps, Step 1 through Step 5. FIG. 10 provides an overview of example positions of the automatic hot water recovery apparatus 108(1) in relation to the operational steps. Similarly, FIG. 11 provides an overview of example positions of the selective hot water isolation device 114(1) in relation to the operational steps. In general, Step 5 is only relevant to the selective hot water isolation device as will be discussed below, therefore FIG. 10 which relates to the automatic hot water recovery apparatus does not include Step 5. Note that some of the operational steps in the example shown in FIGS. 10 and 11 correspond to multiple positions of either the automatic hot water recovery apparatus or the selective hot water isolation device. For example, as shown in FIG. 10, Step 1 can include three positions for the automatic hot water recovery apparatus, designated as Step 1A, Step 1B, and Step 1C. However, Step 1 includes only one corresponding position for the selective hot water isolation device, as shown in FIG. 11. Also note, in this case the position of the automatic hot water recovery apparatus does not change between Step 2, Step 3, and Step 4, while the position of the selective hot water isolation device does change between Step 2, Step 3, and Step 4. These coordinating operational steps and corresponding positions will now be described relative to FIGS. 12 through 31.

Figure 15:
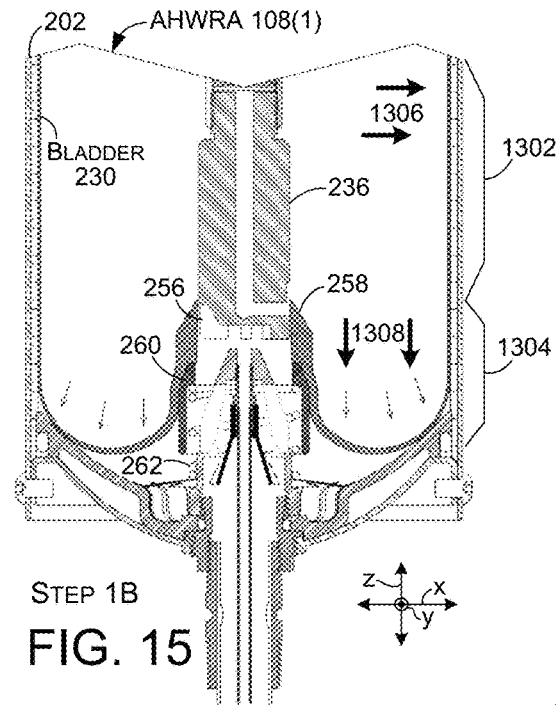
Figure 16:
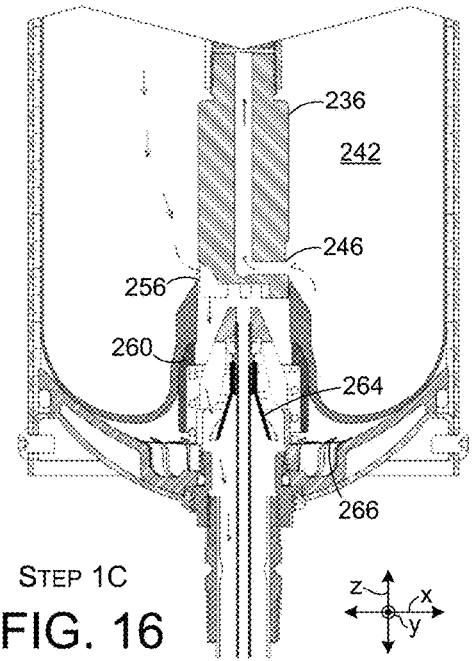
Figure 17:
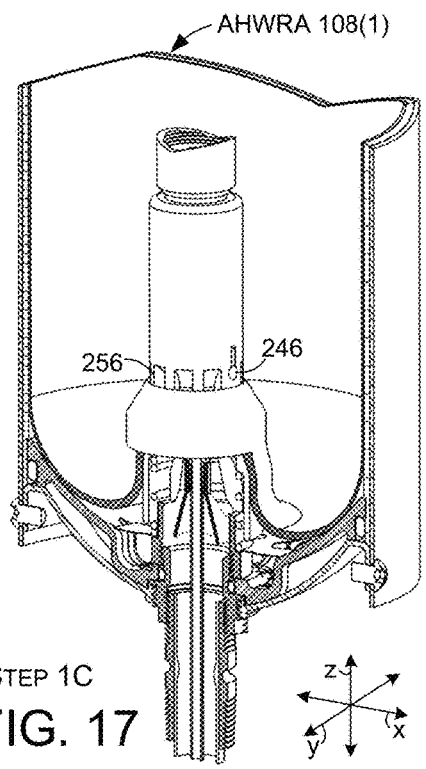

FIGS. 12 through 17 illustrate operational Step 1. FIG. 12 is a sectional view of selective hot water isolation device 114(1). FIGS. 13, 15, and 16 are sectional views and FIGS. 14 and 17 are partial cut-away, perspective views of automatic hot water recovery apparatus 108(1). In Step 1, water is drawn from the hot water fixture 110(1) (FIG. 1). For instance, this could occur when the user turns on the hot water at the fixture. Note that prior to the user turning on the water at the fixture the positions of the automatic hot water recovery apparatus and the selective hot water isolation device are dependent on how long it has been since a user last used water in the system, either at the fixture associated with selective hot water isolation device 114(1), or at any other fixture in the system. Further, rest positions of the automatic hot water recovery apparatus and the selective hot water isolation device will be discussed below in relation to FIGS. 30 and 31.

FIG. 12 shows the selective hot water isolation device 114(1) in Step 1, with water flowing upward from the inlet port 700 to the outlet port 702. Prior to the opening of the fixture, piston 718 can be positioned lower along the stem 720. The pressure differential created by the opening of the hot water fixture and/or the upward water flow can push the piston 718 upward along the stem toward the top of the selective hot water isolation device such that a volume of the outer cylinder upper cavity 740 is decreased and another volume of the outer cylinder lower cavity 742 is increased. When the piston 718 is pushed upward toward the top of the selective hot water isolation device, the piston seal 722 rises along the cylinder wall 710 to a point where the cylinder wall expands outward (shown but not designated). At this point the piston seal no longer seals against the cylinder wall and the water can flow toward outlet port 702 to the hot water faucet. Also in Step 1, cold water in the inner cylinder cavity 744 can be forced back through the metering hole 734 to the cross-over tube 746.

Concurrently in Step 1, as water is drawn from the hot water fixture, the water pressure drops at the dip tube 118 associated with the automatic hot water recovery apparatus 108(1) (see FIG. 2). This water pressure drop creates a pressure differential between the cold water inlet port 224 (the cold water) and the dip tube (the hot water) (and/or a lower end of the automatic hot water recovery apparatus). Accordingly, water flows from the cold water inlet port into the bladder 230. From the time the hot water faucet is opened, the bladder in the automatic hot water recovery apparatus can gradually fill. As it fills, the bladder can be expanded (e.g., stretched). The bladder has a resilient bias to return to a deflated, or non-stretched configuration (e.g., relaxed configuration). The resistance of the bladder to being stretched can contribute to the pressure differential between the hot and cold water. Note that the bladder can be in any position, from fully deflated to fully expanded, prior to water being turned on at any fixture in the system. Therefore, when hot water is turned on, the bladder might already be fully expanded, or could start filling and expanding from a deflated rest position (described below), from one of the positions shown in Steps 1A through 1C, or from another position.

Referring to FIGS. 13 and 14, in some cases, the bladder 230 can be configured to expand in a specific manner. For instance, the bladder 230 may be constructed to have a non-uniform thickness. For example, the bladder can be tapered between an upper region 1302 and a lower region 1304. In another example the upper region 1302 of the bladder may be thinner than the lower region 1304. Such a configuration can promote horizontal expansion of the bladder as indicated by arrows 1306 (e.g., parallel to the x and y references axes) rather than vertical expansion as indicated by arrows 1308 (e.g., parallel to the z reference axis). Alternatively or additionally, bladder spring 262 and snap disk spring 266 can create more resistance to vertical expansion/movement and thereby promote horizontal expansion of the bladder. In either case, as the upper region 1302 of the bladder expands horizontally and contacts the vessel 202, further expansion is prevented and vertical expansion occurs, as shown in FIG. 15.

To summarize, in this implementation, the bladder 230 is configured to promote horizontal expansion of the bladder before vertical expansion. As a result the upper region 1302 of the bladder tends to fill first. Eventually, the lower part of the bladder starts to fill, as shown in FIGS. 15 and 16, corresponding to Step 1B. At this point the bladder 230 is expanded by water such that the bladder generally conforms to the inside of the vessel 202. The shape of the lower region 1304 of the bladder moves the piston 260 downward as the bladder fills. The downward movement causes the piston to slide down the flow tube 236 toward the flow slots 256. As the bladder fills it compresses the bladder spring 262 at the bottom. The resistance from the bladder spring increases the pressure differential as the bladder seal 258 reaches the flow slots 256 in the flow tube. Due to the resistance of the expanding, elastomeric bladder and the compressing bladder spring, the pressure on a cold water side of the automatic hot water recovery apparatus (e.g., at cold water inlet port 224, see FIG. 2) can be approximately three to four pounds per square inch (3-4 psi) greater than on a hot water side (e.g., in the water heater 106, see FIG. 1).

As shown in FIGS. 16 and 17, Step 1C, continued downward movement of the piston 260 causes the piston to slide down past the flow slots 256, allowing water to flow from the bladder interior 242 through the flow slots 256 then through the check valve 264 and into the water heater 106 through the dip tube 118 to the bottom of the water heater (see FIG. 1). At this point, referring to FIGS. 2, 3, and 16, water also flows into the hole 246 in the flow tube 236, through the circulation tube 234, and through the duct 248 in the inlet structure 232 to circulate fresh water to the bladder exterior 250. In some implementations, fresh water flow to the bladder exterior can prevent stagnant water in some areas of the automatic hot water recovery apparatus. Also as shown in FIG. 16, the continued downward movement of the piston eventually can cause the snap disk spring 266 to collapse downward, or flatten. The collapsing of the snap disk spring can represent a change from high resistance to the downward movement of the piston to a lowered resistance. Accordingly, the collapsed configuration of the snap disk spring can allow full water flow through the automatic hot water recovery apparatus 108(1) with less resistance. When the bladder is fully expanded, continued flow of water through the automatic hot water recovery apparatus can continue to increase the pressure differential across the system. In some cases, when the bladder is full and water continues to flow, the pressure differential can increase to 5 psi or greater.

FIG. 18 through 20 illustrate operational Step 2. FIGS. 18 and 19 are sectional views of the selective hot water isolation device 114(1) and the automatic hot water recovery apparatus 108(1), respectively. FIG. 20 is a partial cut-away of the automatic hot water recovery apparatus. In Step 2, the hot water fixture 110(1) (FIG. 1) is closed, such as when the user turns off the hot water tap.

In Step 2, referring to FIG. 18, pressure is equalized on both sides of the piston 718 of the selective hot water isolation device 114(1) in response to the hot water tap being shut off. The resulting increased pressure in the inner cylinder cavity 744 can quickly force the piston downward until the piston seal 722 contacts the cylinder wall 710, separating the outer cylinder upper cavity 740 and the outer cylinder lower cavity 742.

FIGS. 19 and 20 show the automatic hot water recovery apparatus 108(1) with the bladder 230 beginning to deflate from a fully expanded position in Step 2. Note however, in other examples the bladder may begin deflating from another position, depending on how long and/or at what flow rate hot water has been running. Also, if a different fixture in the system is open (e.g., turned on), bladder 230 may not deflate in response to hot water fixture 110(1) being turned off (see FIG. 1).

Referring to FIGS. 19 and 20, at this point the bladder spring 262 in the automatic hot water recovery apparatus 108(1) can push the piston 260 and bladder seal 258 upward to the top of the flow slots 256 in the flow tube 236. Also, as the bladder spring extends upward the snap disk spring 266 is released upward from the collapsed configuration, or "snapped" upward. At this point, the bladder seal 258 is not yet blocking the flow tube groove 254, such that a small amount of water can escape from the bladder interior 242 into the flow tube groove 254 (see FIG. 20), which can slightly reduce the pressure differential between hot water on the dip tube 118 side of the automatic hot water recovery apparatus 108(1) and cold water in the bladder interior. Also in Step 2, the check valve 264 above the dip tube can close. In some implementations, the check valve can be a one way check valve, allowing water to flow down through the dip tube, but closing in response to upward water flow.

Figure 21:
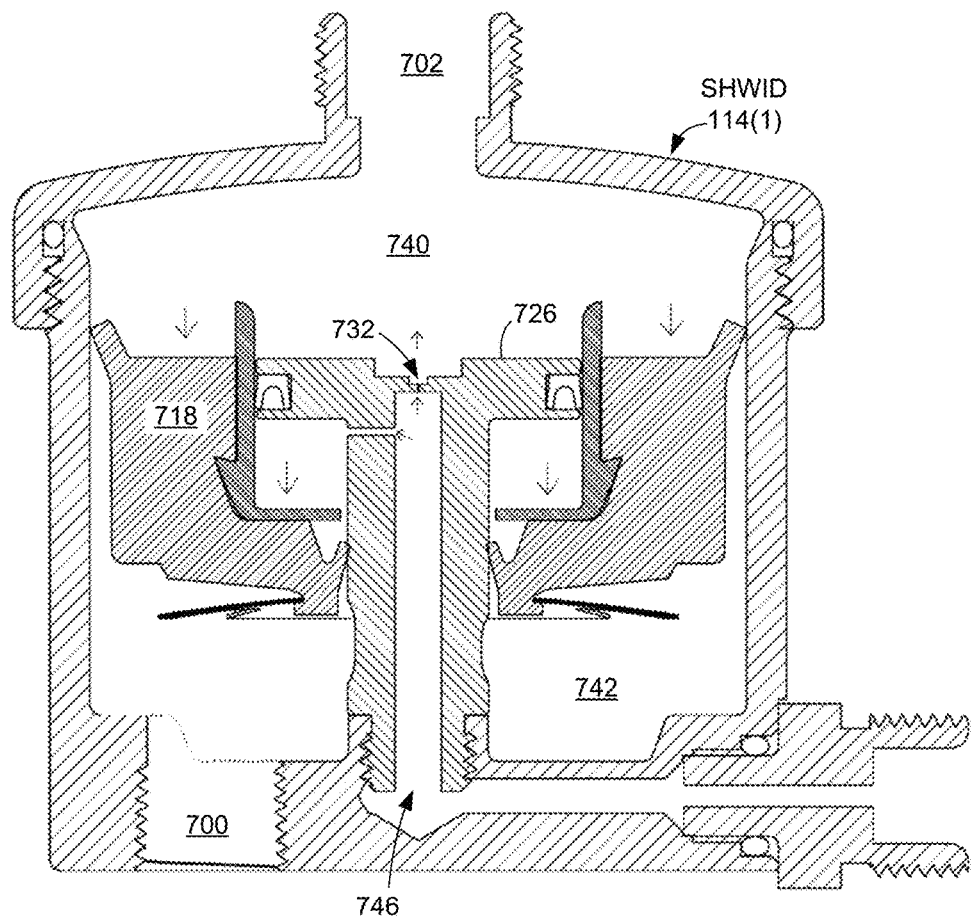

FIG. 21 is a sectional view of the selective hot water isolation device 114(1) illustrating operational Step 3. As noted above, the position of the automatic hot water recovery apparatus 108(1) in Step 3 can be considered similar to the position in Step 2. Operational Step 3 represents a delay in the hot water recovery function of the automatic hot water recovery apparatus and the cold water cross-over device 112(1) (see FIG. 1).

In Step 3, the bladder 230 of automatic hot water recovery apparatus 108(1) can be generally full (see FIGS. 19 and 20), but selective hot water isolation device 114(1) can prevent the bladder 230 from drawing water back. Stated another way, referring to the example in FIG. 21, the outer cylinder upper cavity 740 is isolated from the outer cylinder lower cavity 742 by the piston 718, therefore flow is blocked between the inlet port 700 and the outlet port 702 of the selective hot water isolation device 114(1). However, the elastomeric nature of the bladder in the automatic hot water recovery apparatus can cause a higher pressure in the cold water cross-over line 116(1) (see FIG. 1). As a result of the higher pressure (pressure differential), cold water can flow from the cross-over tube 746 of the selective hot water isolation device through the bleed hole 732 and into the outer cylinder upper cavity 740, slowly forcing the piston 718 downward. A rate of downward movement of the piston can be controlled by the size of the bleed hole, the pressure differential, and a diameter of the stem head 726 relative to an outer diameter of the piston. The slow downward movement of the piston can create a delay before a full flow of cold water can pass through the cross-over tube, therefore delaying the hot water recovery function. Stated another way, the delay in hot water recovery can allow hot water to be more readily available to the user through fixture 110(1) for a period of time after the hot water tap at fixture 110(1) is closed. In this case, an interior volume of the selective hot water isolation device need only be large enough to meter through the delay period. The interior volume, and therefore the selective hot water isolation device, can be smaller than other implementations which can require a larger interior volume to meter through both the delay and the hot water recovery periods.

FIGS. 22 through 29 illustrate operational Step 4, including various sectional views of automatic hot water recovery apparatus 108(1) and selective hot water isolation device 114(1) and sectional, perspective views of the automatic hot water recovery apparatus and the water heater 106. FIG. 23 shows a close-up view of portion 2200 of FIG. 22. FIG. 25 shows a close-up view of portion 2400 of FIG. 24. Operational Step 4 represents the hot water recovery function of cold water cross-over device 112(1) (see FIG. 1).

As shown in FIGS. 22 and 23, the piston 718 of the selective hot water isolation device 114(1) can continue to move downward until the lower piston seal 724 reaches the large stem groove 736 in Step 4A. At this point, cold water can flow from cross-over tube 746, through metering hole 734, into inner cylinder cavity 744, through the large stem groove, to inlet port 700. Thus, cold water can flow from the cold water cross-over line 116(1) into the hot water line 104 (see FIG. 1). As shown in FIGS. 24 and 25, the piston 718 can continue to move downward until the lower piston seal 724 reaches the small stem groove 738 in Step 4B. At this point, cold water can flow from the inner cylinder cavity 744 through the small stem groove 738 to the inlet port. In this case, the metering hole 734 can be slightly larger than the large stem groove 736 and the small stem groove 738. A rate of hot water recovery and a sensitivity of the selective hot water isolation device to the cross-over shutoff stage can be controlled by relative sizes of the metering hole, the large stem groove, and the small stem groove; a resistance of the snap disk spring 748; and the variable pressure differential created by the bladder in the automatic hot water recovery apparatus. The cross-over shutoff stage will be described further in relation to Step 5, below.

Additionally in Step 4B, referring to FIGS. 24 and 25, the inner cylinder liner 728 can be lowered past the stem head seal 730, allowing water to pass from the inner cylinder cavity 744 upward into the outer cylinder upper cavity 740. The flow of the cold water into the outer cylinder upper cavity 740 can expose a full surface area of a top side of piston 718 to the higher pressure of the cold water side. This can further encourage the downward movement of piston 718. Also in Step 4B, the snap disk spring 748 contacts a bottom of the valve body 708. The resistance of the snap disk spring can help support the piston in the position shown in FIG. 24 throughout the cross-over hot water recovery period.

Figure 29:
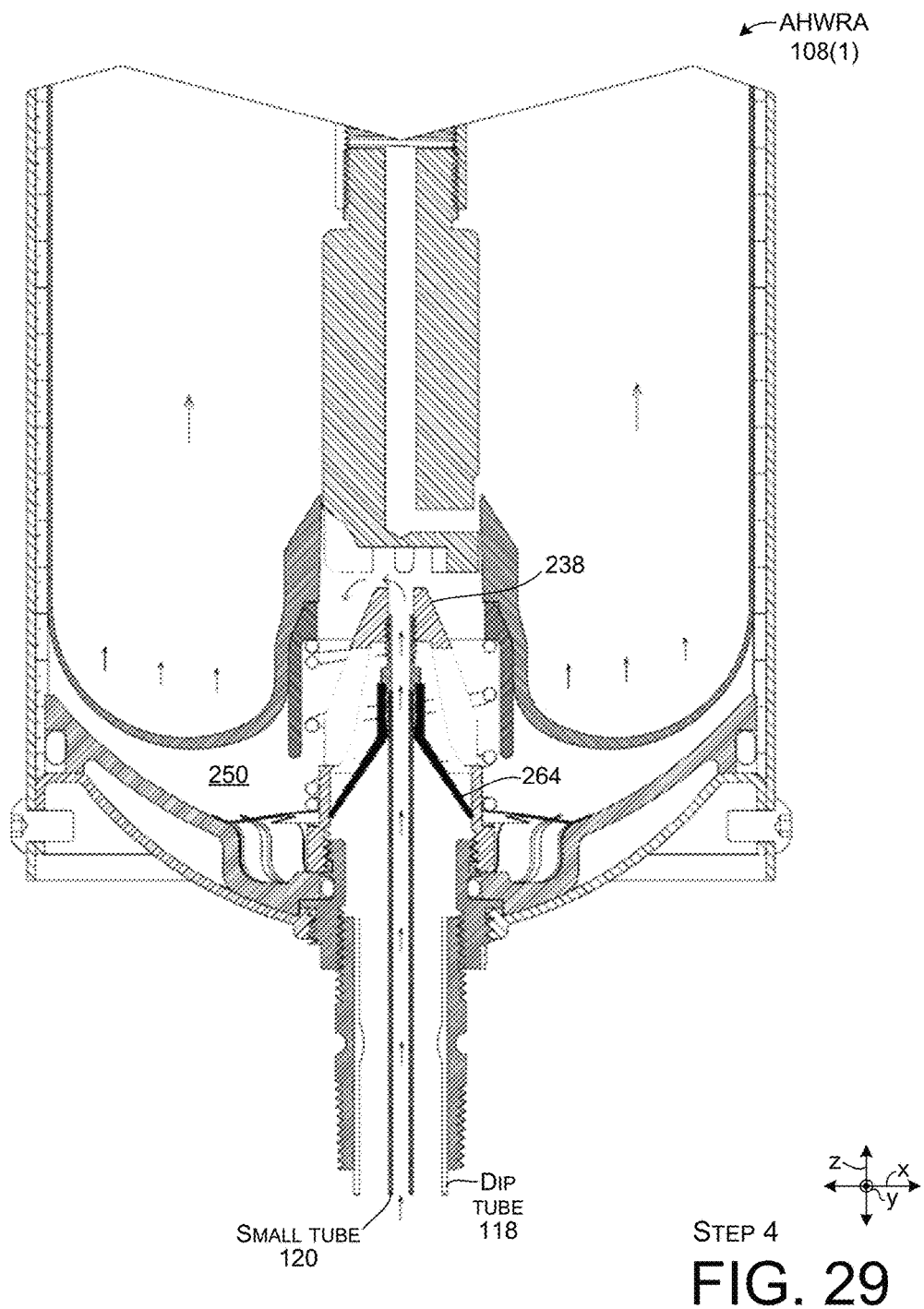

The operation of the automatic hot water recovery apparatus 108(1) in Step 4 will now be explained relative to FIGS. 26 through 29. Note that FIGS. 27 and 28 show close-up portions 2600 and 2602 of FIG. 26. FIGS. 26 through 29 illustrate how relatively hot water can be prevented from entering the automatic hot water recovery apparatus. In the example in FIG. 26, as water in the hot water line 104 is drawn back to the water heater 106, relatively cold water is drawn from the bottom (e.g., lower portion) of the water heater into the lower end of the small tube 120 within the dip tube 118. The small tube can have a very small diameter such that the water passes through it at a relatively high velocity. For example, in some cases the diameter of the small tube can be approximately 0.1 inches or less and the diameter of the dip tube can be approximately 0.5 inches or more. This can enable relatively cold water to pass from the bottom of the water heater to the automatic hot water recovery apparatus such that the water in the small tube draws less heat (e.g., reduces heat transfer) from the upper end of the water heater. As shown in FIG. 29, the relatively cold water passes from the small tube around the center cone 238 into the bladder exterior 250. At this point, water in the dip tube is relatively warmer than water drawn from the bottom of the water heater through the small tube. Note that check valve 264 can prevent the warmer water from the dip tube to be drawn into the automatic hot water recovery apparatus.

Figure 30:
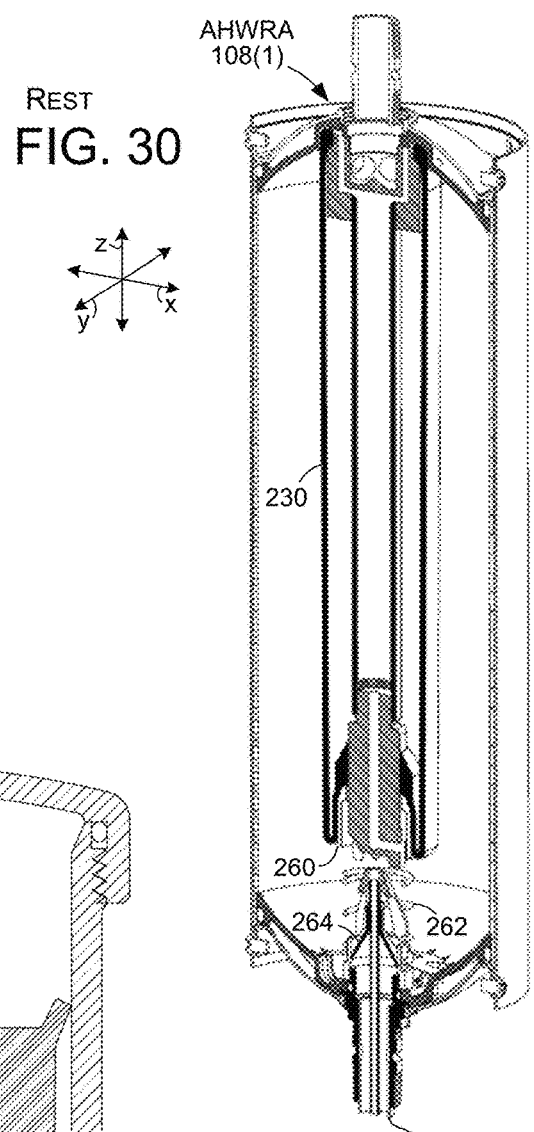

If the water fixtures in the system remain closed (e.g., no hot water is running), the bladder 230 in the automatic hot water recovery apparatus 108(1) can continue to deflate to a Rest position (e.g., steady-state), as shown in the sectional, perspective view in FIG. 30. At this point, the pressure can be equalized between the hot water and cold water sides of the system. The resilient bias of the bladder can be considered satisfied in this position. Also in this position, the bladder spring 262 can be expanded so that the bladder spring no longer tends to push the piston 260 upward. The bladder can remain in this position until hot water is turned on again. The check valve 264 can remain closed. In this case, the selective hot water isolation device 114(1) can remain in the position shown in FIG. 24, which can also be considered 'Rest A'. After the bladder in the automatic hot water recovery apparatus has fully contracted, the pressure can also equalize across the selective hot water isolation device. In this case, when pressure is equalized across the system, water is generally no longer flowing through either the automatic hot water recovery apparatus or the selective hot water isolation device.

Figure 31:
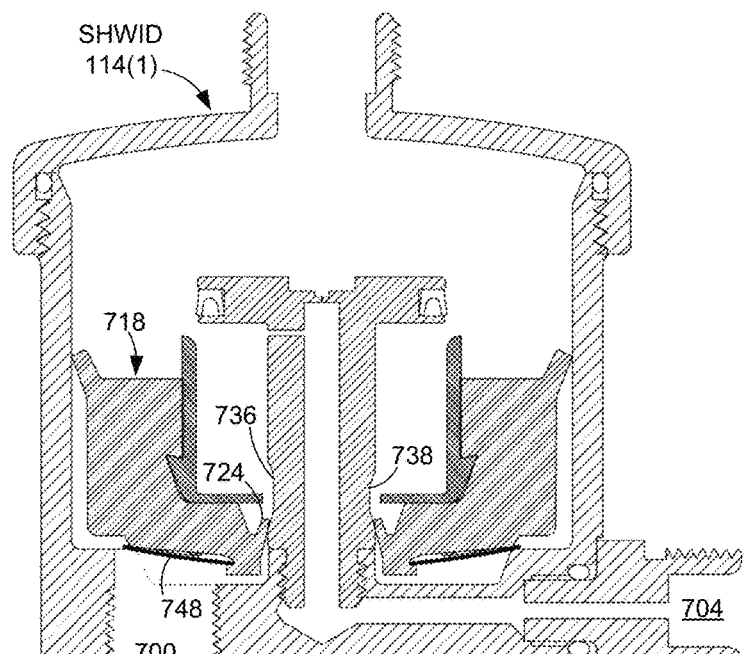

In some cases, another fixture 110 can be turned on in the system 100 (see FIG. 1) either before or after the automatic hot water recovery apparatus 108(1) and the selective hot water isolation device 114(1) have reached a Rest or steady-state position. For example, a user can turn on hot water at fixture 110(2). In this case, the selective hot water isolation device can perform a shutoff function so that cross-over cold water from cross-over device 112(1) does not flow to the other fixture in the system where a user desires hot water. Operational Step 5 can represent a cross-over shutoff stage for the selective hot water isolation device 114(1). Step 5 is illustrated in FIG. 31, which is a sectional view of selective hot water isolation device 114(1).

In Step 5, when a hot water valve (sink, faucet, dishwasher, shower valve, etc.) is opened anywhere in the system the pressure differential can slowly increase as the bladder of the automatic hot water recovery apparatus 108(1) fills and hot water is used. As long as the opened hot water valve is not fixture 110(1), the pressure differential can force the piston 718 of selective hot water isolation device 114(1) downward into the cross-over shutoff stage, as shown in FIG. 31. In Step 5, the cross-over shutoff stage, the piston is lowered such that the lower piston seal 724 is below the large stem groove 736 and the small stem groove 738. Also, snap disk spring 748 is in a collapsed position. In this configuration water does not flow through the selective hot water isolation device, such as from the cross-over outlet 704 to the inlet port 700. This feature can prevent cold water from one or more cold water cross-over devices 112 from reducing a hot water temperature at other fixtures 110 in the system (see FIG. 1).

Viewed another way, the selective hot water isolation devices 114 can be sensitive to activity elsewhere in the system. The sensitivity can be such that cold water cross-over through the selective hot water isolation device is interrupted when the bladder of the automatic hot water recovery apparatus 108(1) is filled by a hot water draw, even a low flow draw, at any point of use in the system. When the bladder is filled, the pressure differential will continue to increase, eventually creating enough downward pressure on the snap disk spring of the selective hot water isolation device to cause it to snap downward, shutting off the cold water cross-over. The sensitivity of the shutoff stage of the selective hot water isolation device to the pressure differential can be determined by a resistance of the snap disk spring to being collapsed in combination with the size of the grooves in the stem. For example, the resistance of the snap disk spring can allow it to resist downward movement of the piston beyond the position shown in FIG. 24. However, once the pressure differential across the piston reaches a certain point, the snap disk spring will collapse. In some cases, the pressure differential that causes the snap disk spring to collapse can be five pounds per square inch (5 psi) or greater. Further, as noted above, the stem grooves allow pressure across the selective hot water isolation device to dissipate by allowing the cold water cross-over flow. However, the increasing pressure differential caused by hot water flow at a different fixture in the system when the bladder is full can eventually overcome both the pressure release afforded by the cold water cross-over flow and the resistance of the snap disk spring. Therefore, the size of the stem grooves, and therefore how much cross-over flow they let pass, will also affect the sensitivity of the shutoff stage of the selective hot water isolation device. In some implementations the flow allowed through the stem grooves can be less than the flow of a low flow showerhead (or other low flow hot water fixture). In this case, the system can be considered sensitive to a low flow hot water fixture, shutting off unwanted cold water cross-over flow when the low flow hot water fixture is in use.

Note that in the automatic hot water recovery apparatus 108(1), the flow from the bladder interior 242 through the flow tube groove 254 (described above in relation to FIG. 19) can also be a factor in the sensitivity of the system described above. As noted above, the flow through the flow tube groove 254 can release pressure in the system as water is allowed to escape from the contracting bladder. Accordingly, in some implementations hot water flow at a fixture in the system can be greater than the flow through the flow tube groove to allow the bladder to expand. If the water flow at a fixture is greater than the flow through the flow tube groove, the pressure differential across the system can overcome the pressure release related to the flow tube groove. For example, the flow tube groove can be sized such that the flow through the flow tube groove is less than the flow of a low flow hot water fixture. This can drive full expansion of the bladder, after which continued hot water use can increase the pressure differential to a point at which the cross-over shutoff stage in the selective hot water isolation device can be triggered.

Referring again to FIG. 31, the selective hot water isolation device 114(1) can remain in the cross-over shutoff position when water use in the system ceases and the automatic hot water recovery apparatus reverts to the steady-state or Rest position. In this case, FIG. 31 can be considered a 'Rest B' position for the selective hot water isolation device. For example, the snap disk spring 266 can stay collapsed, with the piston 718 lowered and cross-over flow shut off. Note that in addition to a resistance to being collapsed, the snap disk spring can have another resistance to return to the un-collapsed configuration. For example, some amount of upward force may be required to "snap" the snap disk spring back upward. Therefore, even if pressure is equalized across the snap disk spring, the selective hot water isolation device can stay in the Rest B position until Step 1 recurs, when hot water is turned on at fixture 110(1). Therefore, in some implementations, the resting position of an individual selective hot water isolation device can be either Rest A (FIG. 24) or Rest B (FIG. 31), depending on whether the cross-over shutoff stage for that particular selective hot water isolation device was triggered in the preceding cycle of operational steps.

To summarize, an example operation of a system with an automatic hot water recovery apparatus and selective hot water isolation devices is described above. The selective hot water isolation devices do not simply allow cold water cross-over whenever system hot water pressure is lower than system cold water pressure. Individual selective hot water isolation devices can limit cold water cross-over to instances where hot water flowed through a fixture proximate to their location. Further, the selective hot water isolation devices can delay the cold water cross-over for a period of time after hot water usage stops at the fixture. Thus, for example, a user that is intermittently using hot water is not inconvenienced by cold water entering the hot water line. Viewed from another perspective, the selective hot water isolation devices can allow cold water cross-over in a period or window after hot water flow through the selective hot water isolation device. The window can start immediately upon cessation of the hot water flow through the selective hot water isolation device or begin after a delay period. Additionally, the selective hot water isolation device can allow for a cross-over shutoff stage that can interrupt the delay and/or cross-over periods if water is drawn elsewhere in the system.

Viewed from still another perspective, some implementations of the selective hot water isolation devices can block cold water cross-over flow unless one or more conditions occur. Additionally, some implementations of the selective hot water isolation devices can shut off the cold water cross-over flow if another condition occurs. For instance, in one configuration, the selective hot water isolation device can block cold water cross-over flow unless a first condition occurs. This first condition can be hot water flow through the selective hot water isolation device. Stopping the hot water flow can be thought of as a second condition (e.g., cold water cross-over flow is blocked until both conditions occur). The occurrence of the second condition (e.g., cessation of hot water flow through the selective hot water isolation device) can cause the selective hot water isolation device to initiate a window in which cold water cross-over flow can occur through the selective hot water isolation device. The cold water cross-over flow can be driven by a third condition, a pressure differential caused by the bladder in the automatic hot water recovery apparatus contracting, pulling hot water back to the water heater. The third condition, and therefore the window of cold water cross-over flow, can start immediately after the second condition occurs or after a delay. The window can have a duration defined by the selective hot water isolation device. For instance, the size of bleed hole 732 can partially define the delay and/or duration. A fourth condition can be hot water flow at another fixture in the system, which can cause the bladder to expand again eventually trigger a cross-over shutoff stage. These conditions will be described further relative to FIG. 60, below.

Additional Automatic Hot Water Recovery Apparatus Examples

Figure 32:
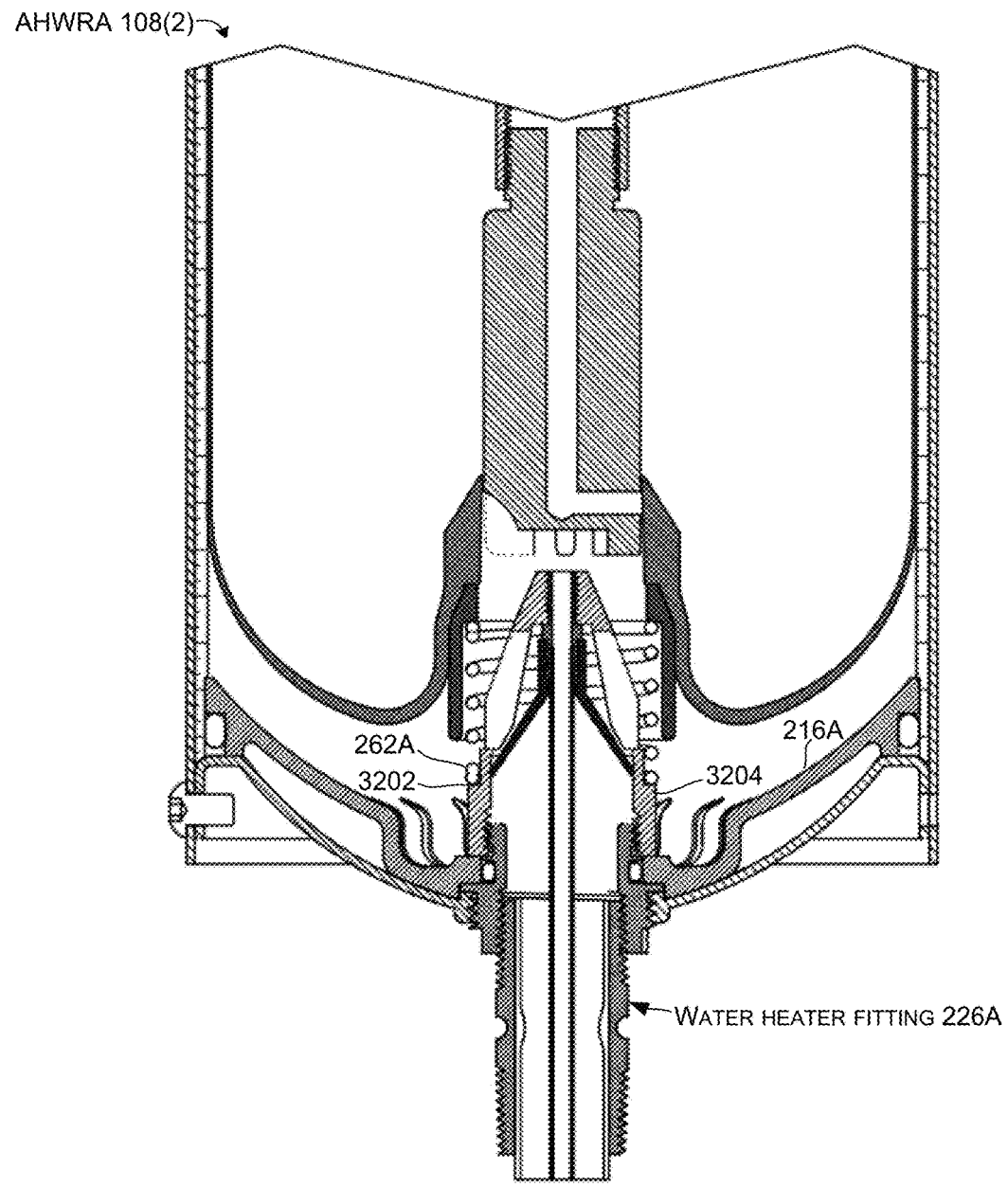
Figure 33:
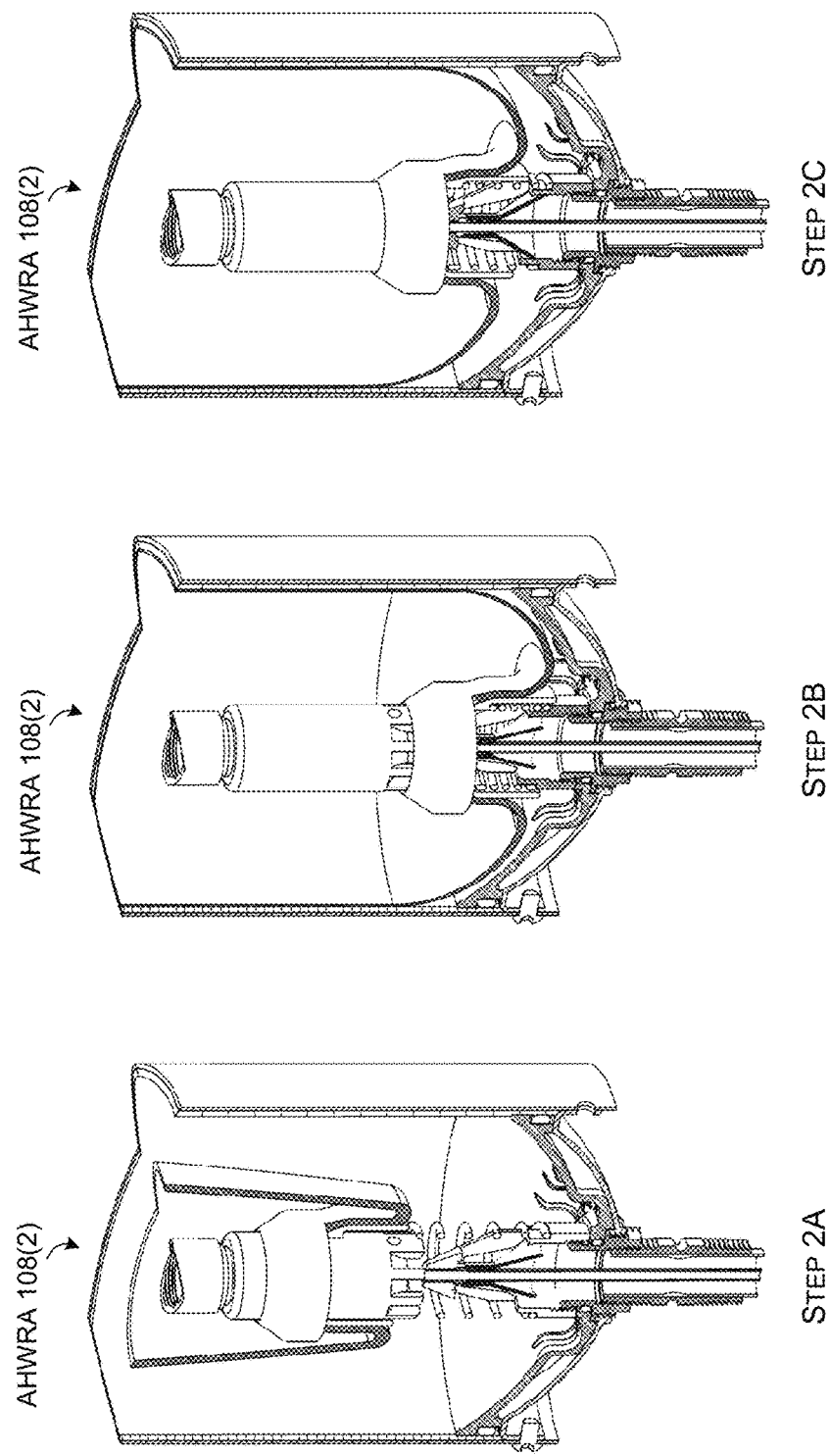
Figure 34:
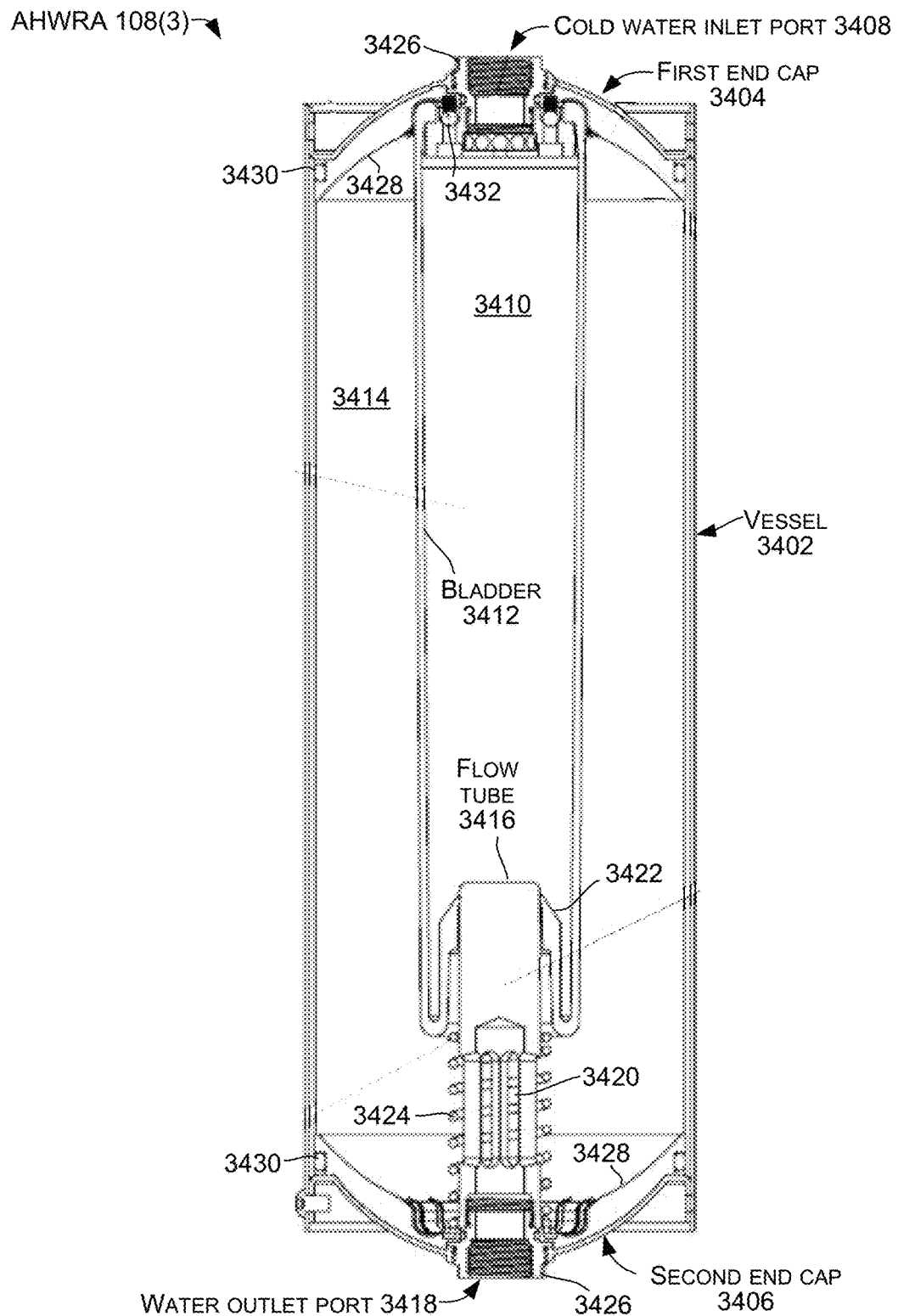
Figure 35:
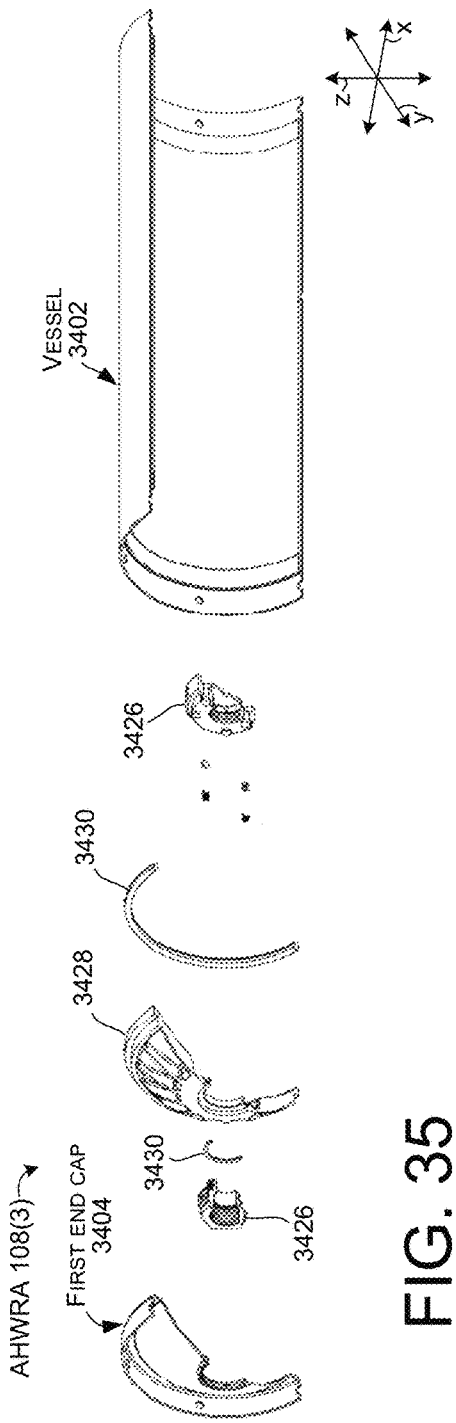
Figure 36:
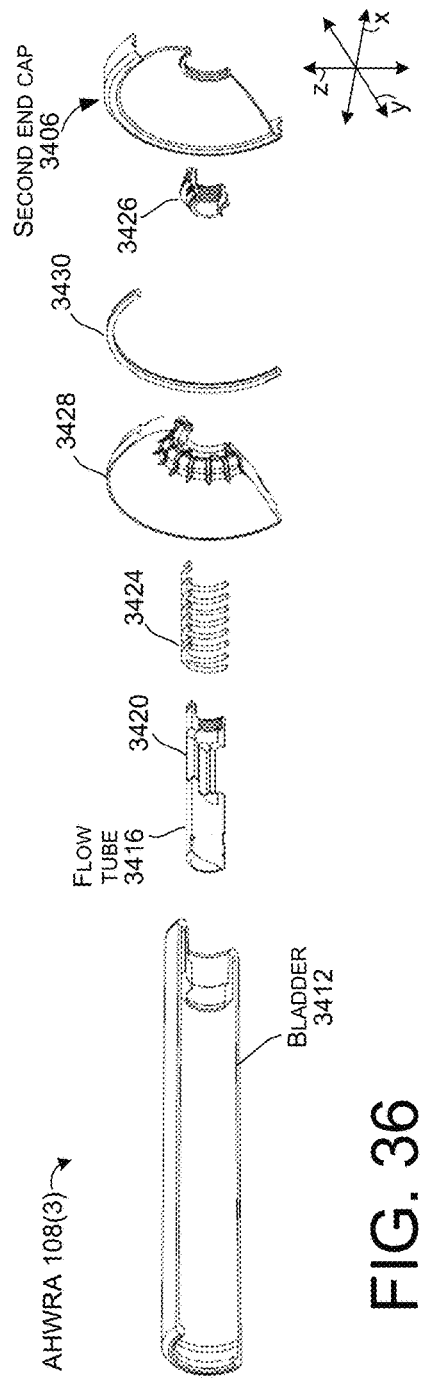

FIGS. 32 and 33 collectively illustrate a second example automatic hot water recovery apparatus 108(2). FIGS. 34 through 47 collectively illustrate a third example automatic hot water recovery apparatus 108(3).

As shown in FIGS. 32 and 33, automatic hot water recovery apparatus 108(2) is substantially similar to automatic hot water recovery apparatus 108(1) described above. For sake of brevity components which are substantially similar are not reintroduced here and instead a suffix "A" is used to distinguish components of automatic hot water recovery apparatus 108(2) from those of automatic hot water recovery apparatus 108(1). In this implementation automatic hot water recovery apparatus 108(2) does not include snap disk spring 266 (FIG. 3). Accordingly, some aspects of the water heater fitting can have different dimensions or features. For example, in automatic hot water recovery apparatus 108(2), bladder spring 262A rests on a lip 3202 of an upper piece 3204 of water heater fitting 226A. In automatic hot water recovery apparatus 108(1), the bladder spring 262 and snap disk spring 266 rest on a lip of an upper piece (shown but not designated) of water heater fitting 226; however, the lip in automatic hot water recovery apparatus 108(1) is higher than lip 3202 in relation to the interior cap 216 and 216A, respectively. Also, automatic hot water recovery apparatus 108(2) does not include flow tube groove 254. Other differences in structures of automatic hot water recovery apparatus implementations are contemplated.

FIGS. 34 through 47 collectively illustrate automatic hot water recovery apparatus 108(3). In this case the automatic hot water recovery apparatus includes a vessel 3402 that includes first and second end caps 3404 and 3406. The first end cap couples a cold water inlet port 3408 to a bladder interior 3410. A bladder exterior 3414 is defined between the bladder 3412 and the vessel 3402. A flow tube 3416 is connected through the second end cap 3406 to a water outlet port 3418. Fluid slots 3420 are formed in the flow tube 3416. A piston can be positioned around the flow tube. In this case, a lower end 3422 of the bladder 3412 can form the piston. In other cases, the piston can be distinct from the bladder 3412 and the lower end of the bladder can be secured to the piston. The automatic hot water recovery apparatus can also include a spring 3424, fittings 3426, interior end caps 3428, seals 3430, and ball valves 3432.

FIGS. 37 through 47 are sectional, perspective views of automatic hot water recovery apparatus 108(3) that collectively show different example operational stages relative to a system with a water heater, hot and cold water lines, fixtures, and selective hot water isolation devices (similar to FIG. 1). The operational stages of automatic hot water recovery apparatus 108(3) are similar to the operational stages of automatic hot water recovery apparatus 108(1). For sake of brevity the operation of automatic hot water recovery apparatus 108(3) will be described briefly here, focusing on differences as compared to the operation of automatic hot water recovery apparatus 108(1).

FIGS. 37 and 38 are sectional, perspective views of the automatic hot water recovery apparatus 108(3). FIG. 38 shows a close-up of portion 3700 of FIG. 37. In this case, the automatic hot water recovery apparatus is generally in a steady-state or resting configuration, with the bladder 3412 deflated. Also, ball valves 3432 are closed.

Figure 39:
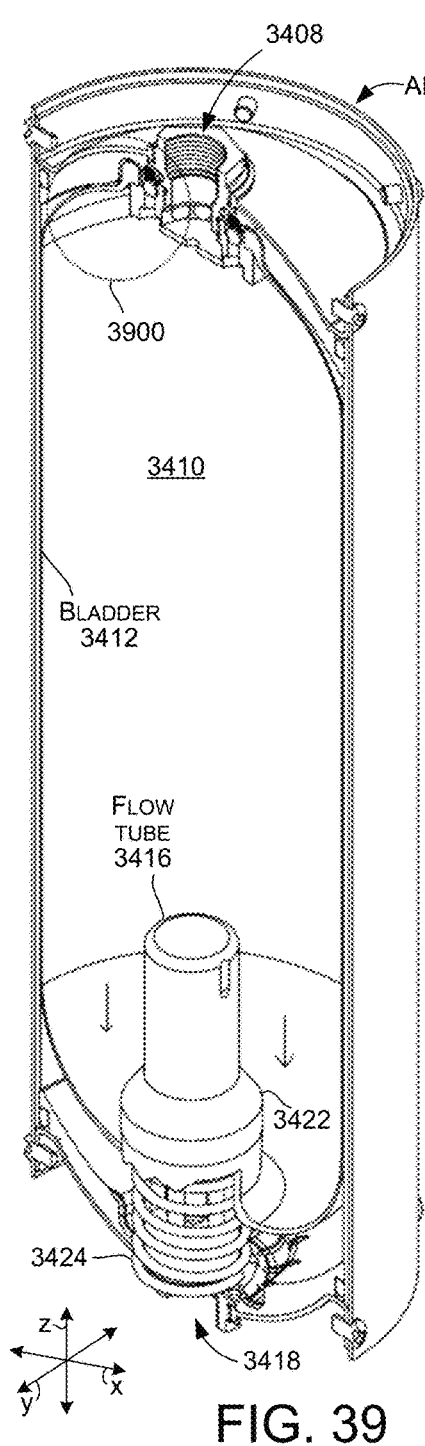
Figure 40:
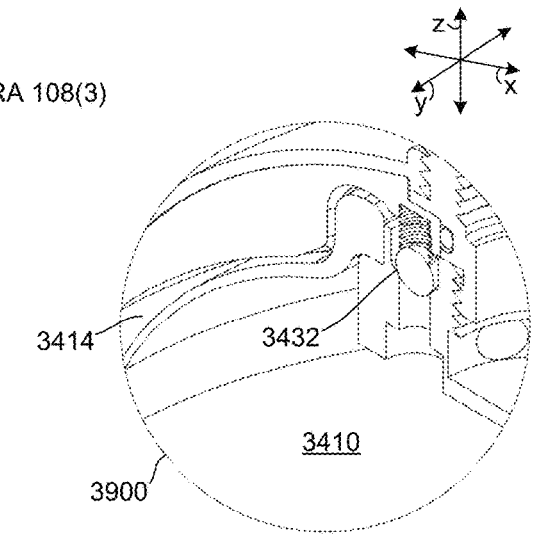
Figure 41:
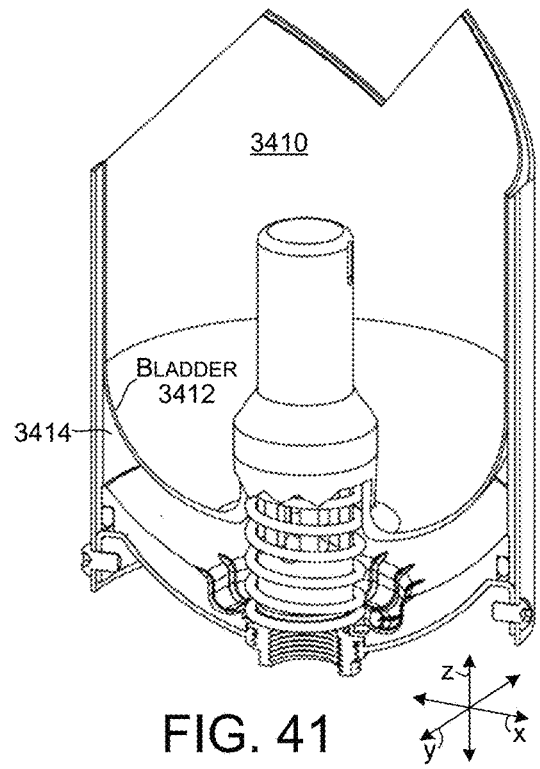

FIGS. 39 through 41 are partial cut-away, perspective views of the automatic hot water recovery apparatus 108(3). FIG. 40 shows a close-up of portion 3900 of FIG. 39. In FIGS. 39 through 41, hot water has been turned on at a fixture, dropping the pressure at the water outlet port 3418 relative to the cold water inlet port 3408. This causes the bladder 3412 of automatic hot water recovery apparatus 108(3) to expand. As the bladder expands horizontal and then vertically, the lower end 3422 of the bladder moves downward on the flow tube 3416, compressing the spring 3424. In this case, the pressure in the bladder interior 3410 is greater than the bladder exterior 3414 (best shown in FIG. 41). The pressure differential can be approximately four pounds per square inch (4 psi). This pressure differential is not great enough to open the ball valves 3432, which remain closed.

FIGS. 42 through 44 are partial cut-away, perspective views of the automatic hot water recovery apparatus 108(3). FIG. 43 shows a close-up of portion 4200 of FIG. 42. In FIGS. 42 through 44, the lower end 3422 of the bladder 3412 continues moving downward, exposing bleed hole 4202. This stage can be considered a low flow stage, where a small amount of flow can pass from the bladder interior 3410 through the bleed hole to the water outlet port 3418. Also, the ball valves 3432 remain closed.

Figure 45:
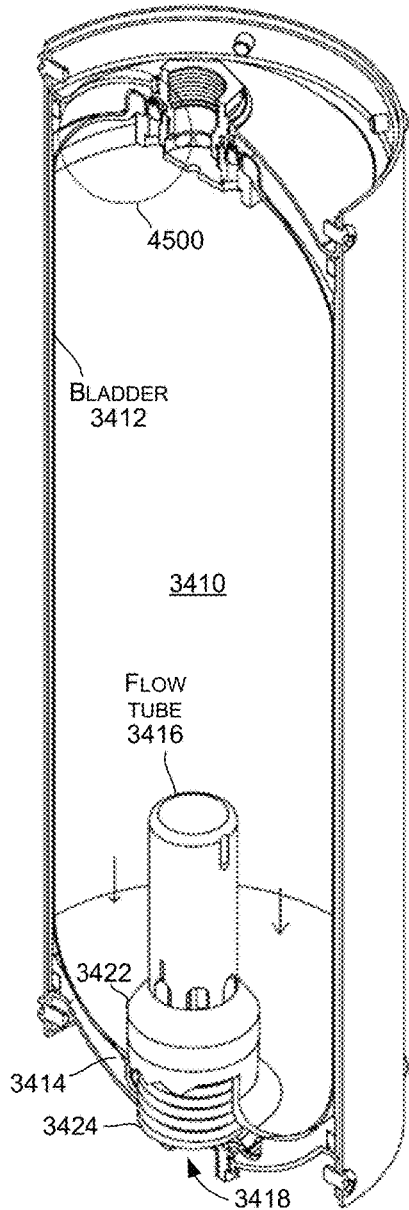
Figure 46:
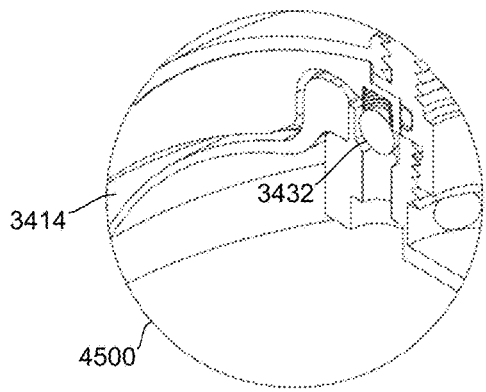
Figure 47:
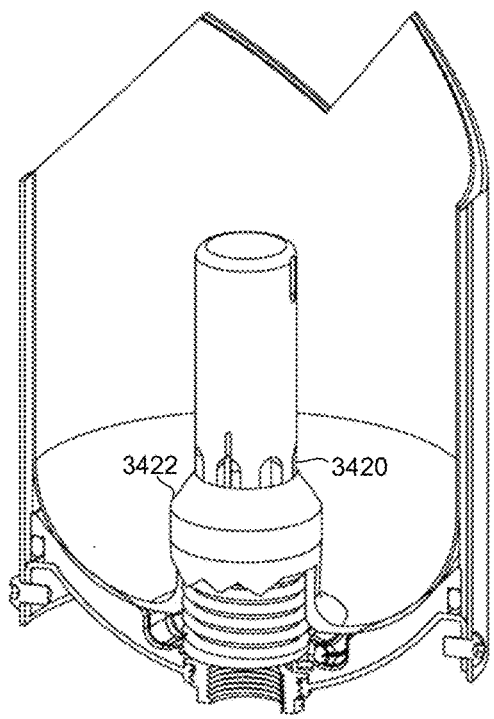

FIGS. 45 through 47 are partial cut-away, perspective views of the automatic hot water recovery apparatus 108(3). FIG. 46 shows a close-up of portion 4500 of FIG. 45. In FIGS. 45 through 47, the bladder seal has moved down past the fluid slots 3420. In this case, the pressure differential between the bladder interior 3410 and the bladder exterior 3414 can increase to approximately 10 psi. The increased pressure can push the lower bladder 3422 further down the flow tube 3416, which can further compress the spring 3424. Also, the pressure differential can be great enough to open the ball valves 3432, by pushing the ball valves upward. This can allow a small flow of fresh, cold water to pass from the bladder interior to the bladder exterior, replacing water drawn from the water heater during a previous recovery cycle.

When hot water is shut off, automatic hot water recovery apparatus 108(3) will begin the recovery stage. In the recovery stage, the ball valves close and the bladder begins to deflate, drawing back water from the water heater, which in turn draws water from the hot water line(s) back into the water heater.

Additional Selective Hot Water Isolation Device Examples

FIGS. 48 through 51 collectively illustrate second example selective hot water isolation device 114(2). FIGS. 52 through 55 collectively illustrate third example selective hot water isolation device 114(3) in more detail. FIGS. 56 through 59 collectively illustrate fourth example selective hot water isolation device 114(4). The FIGS. for each additional example selective hot water isolation device include a sectional view, an exploded perspective view, a sectional exploded perspective view, and sectional views of an overview of operation.

Figure 48:
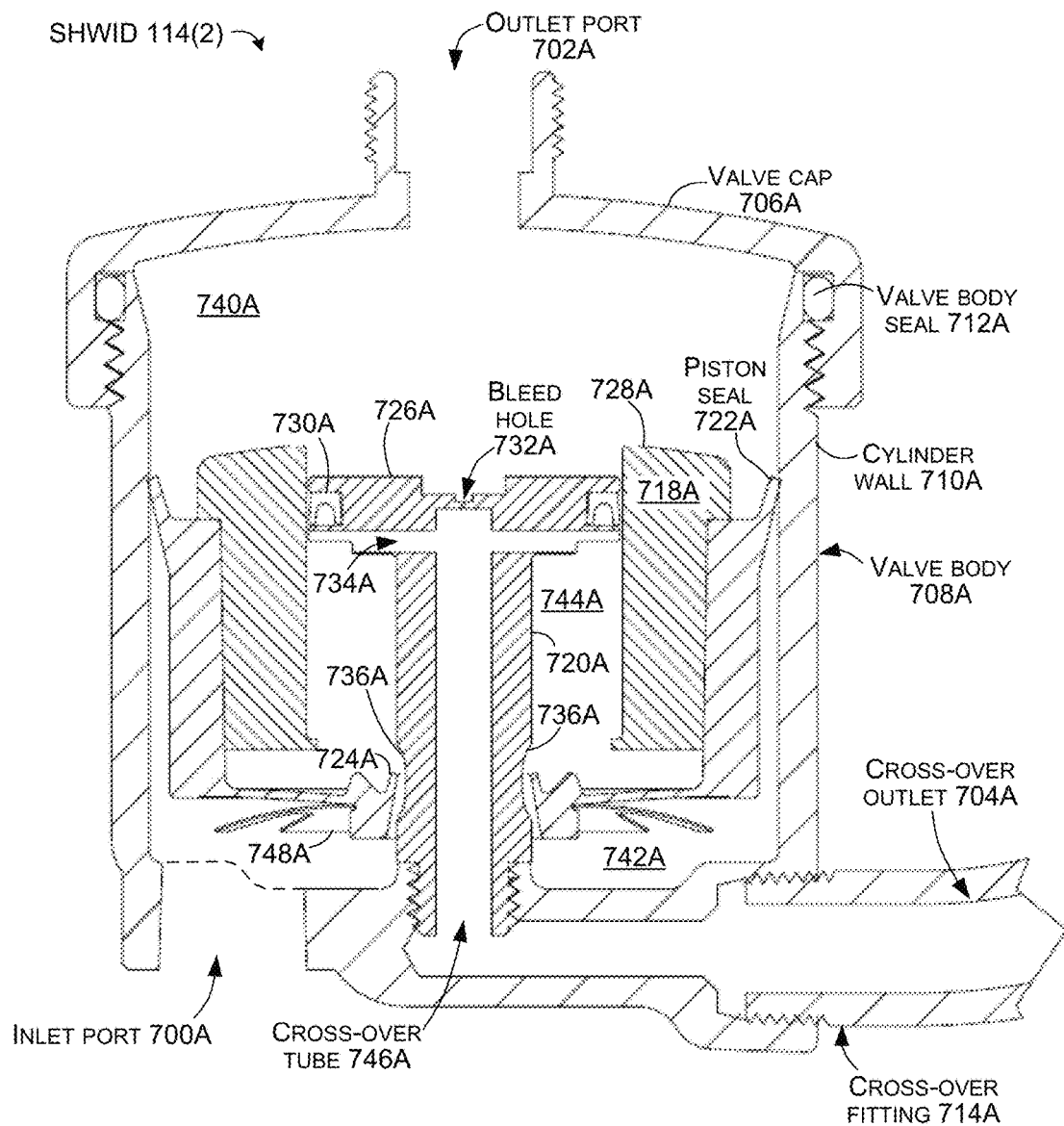
Figure 51:
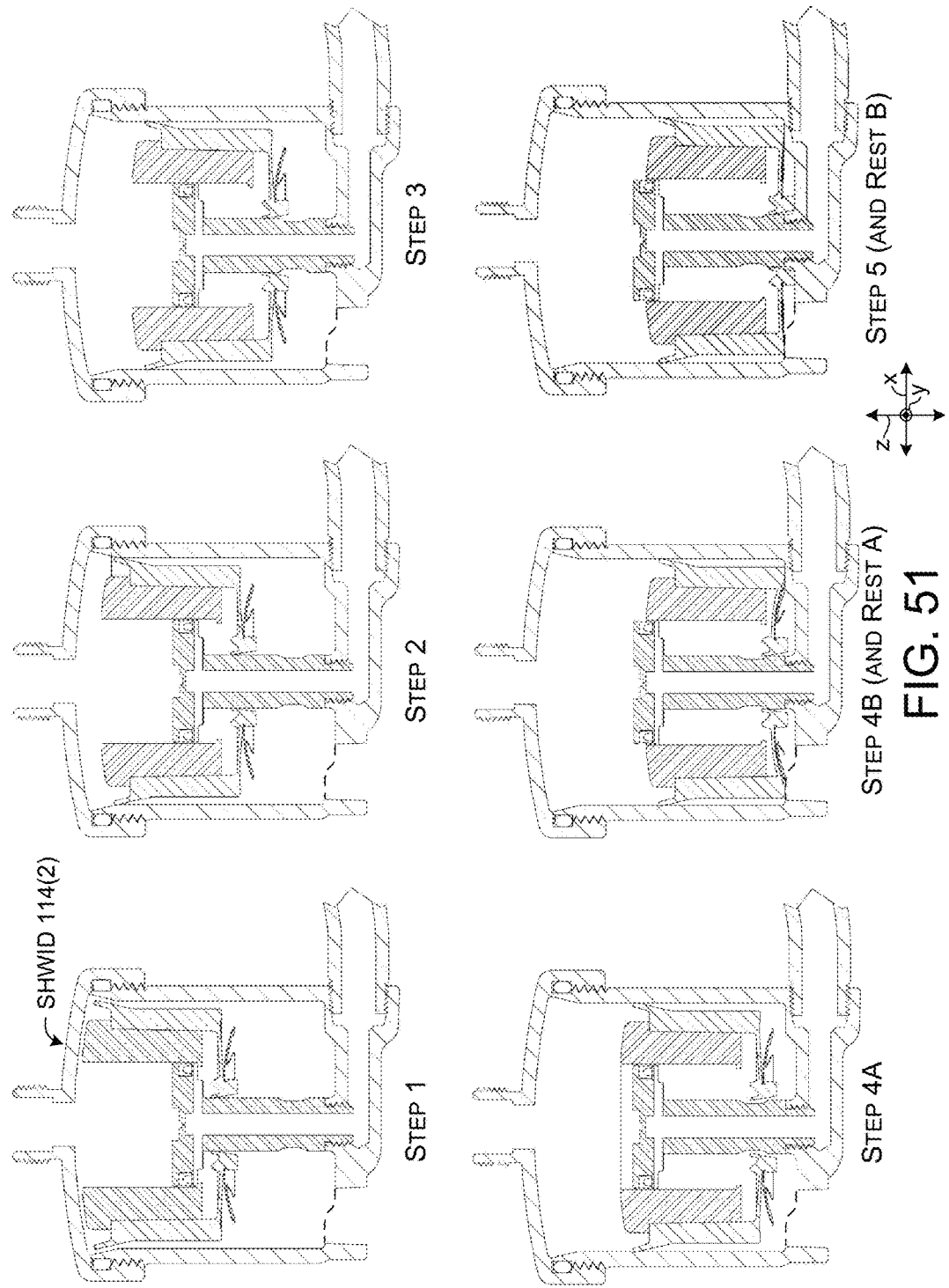

As shown in FIGS. 48 through 50, selective hot water isolation device 114(2) is substantially similar to selective hot water isolation device 114(1) described above. For sake of brevity components which are substantially similar are not reintroduced here and instead a suffix "A" is used to distinguish components of selective hot water isolation device 114(2) from those of selective hot water isolation device 114(1). Note in this case, rather than a large stem groove 736 and a small stem groove 738 (see FIG. 5), multiple stem grooves 736A have the same dimensions. Other differences in structures of the selective hot water isolation device are contemplated. FIG. 51 provides an overview of example operational stages of selective hot water isolation device 114(2). The labeled operational steps in FIG. 51 correlate roughly to the operational steps shown in FIG. 11 for selective hot water isolation device 114(1).

Figure 52:
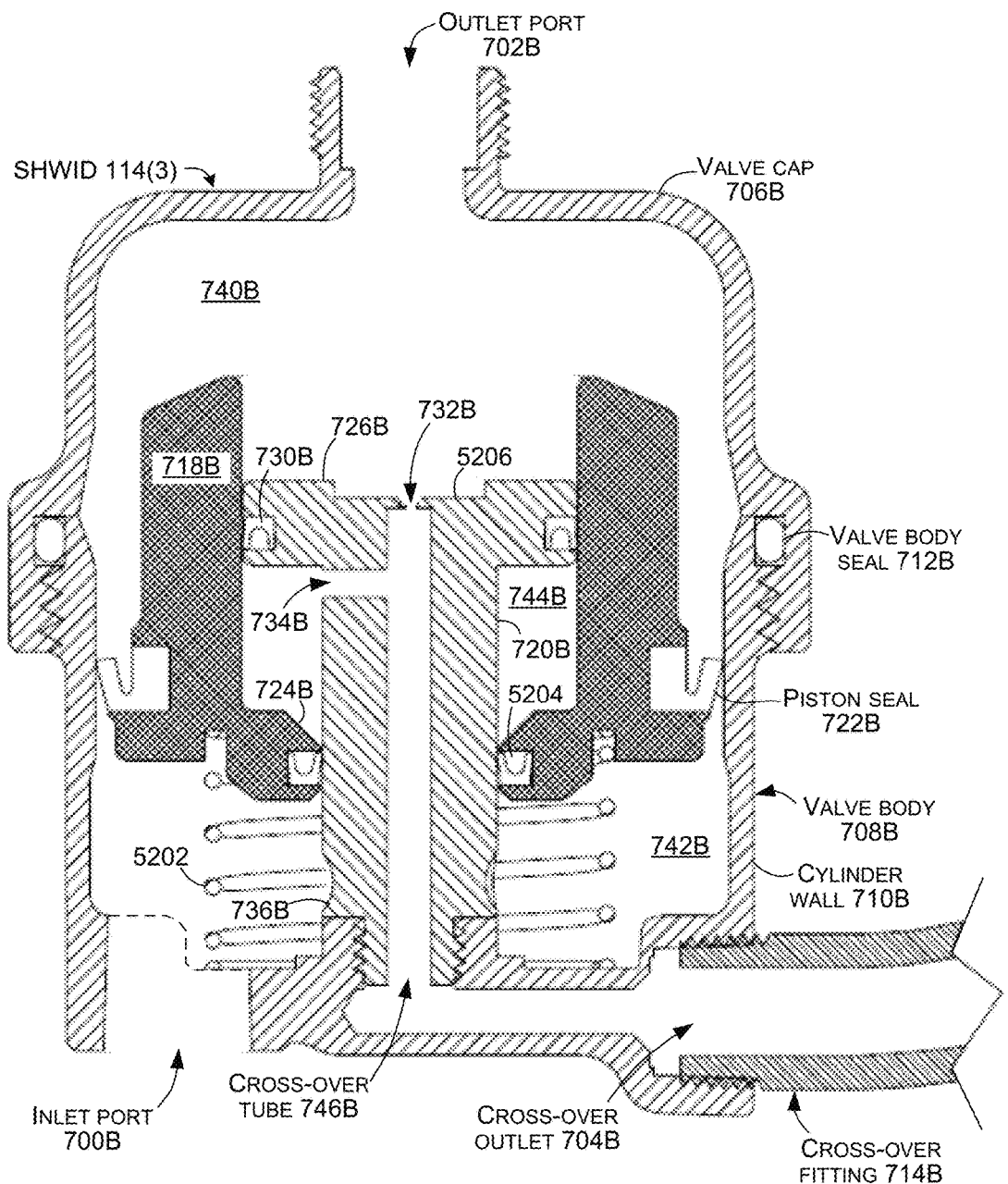
Figure 53:
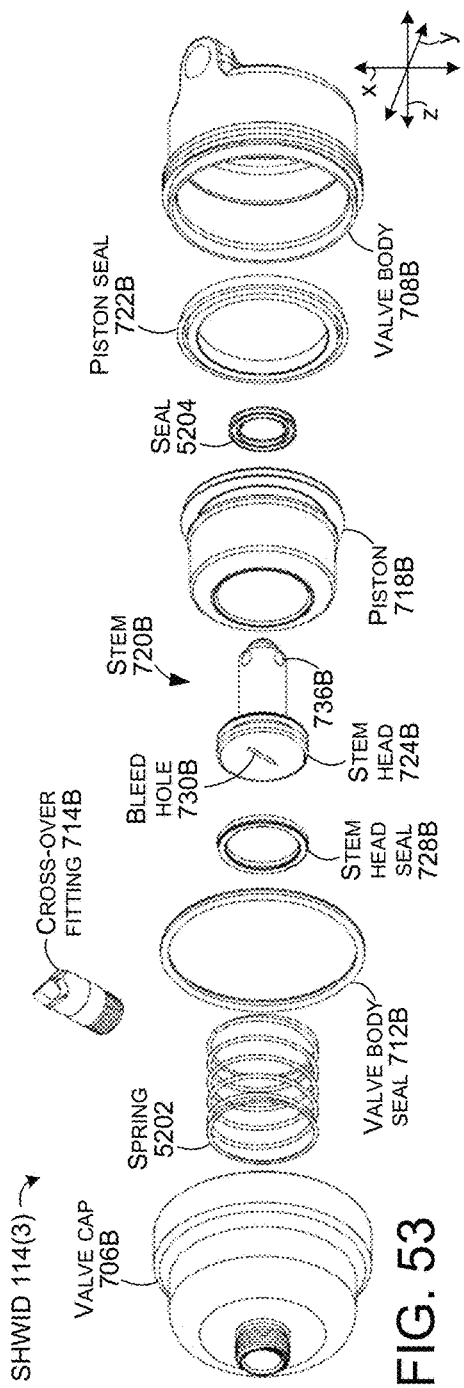
Figure 54:
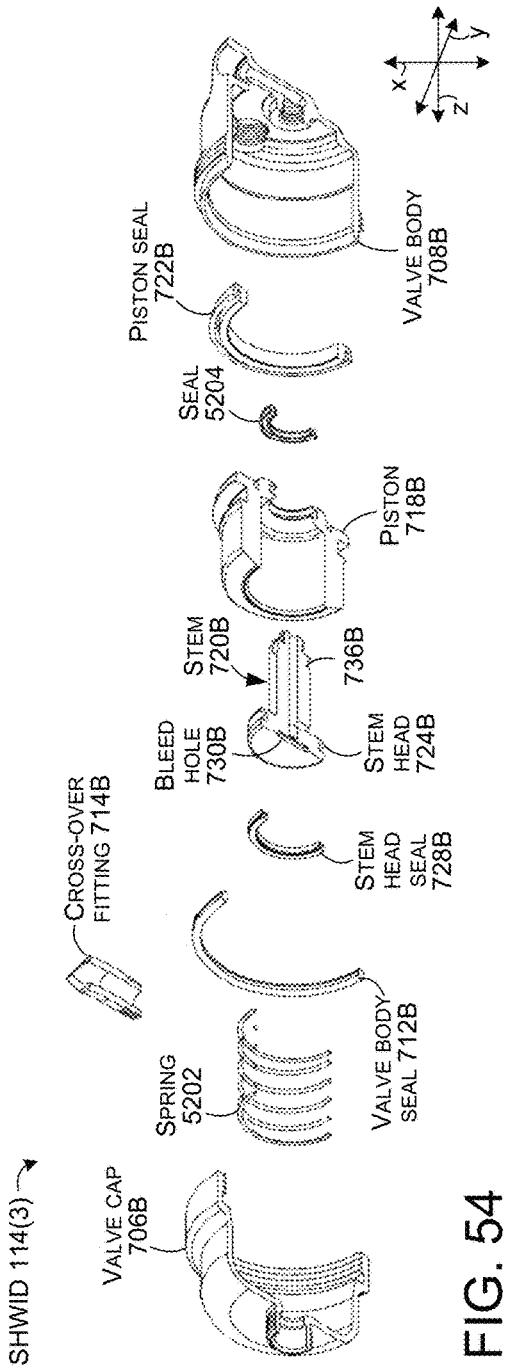
Figure 55:
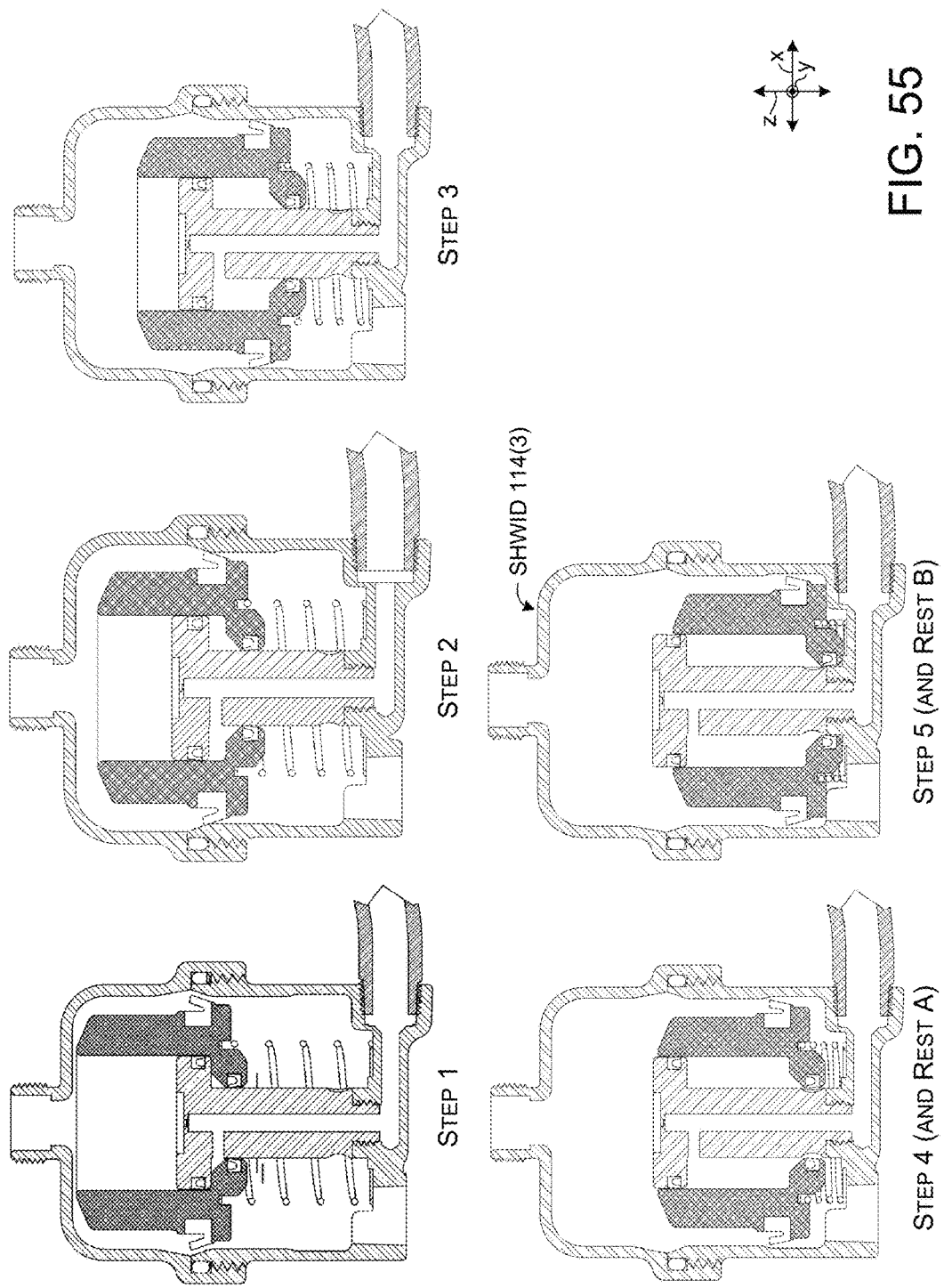

As shown in FIGS. 52 through 54, selective hot water isolation device 114(3) is also substantially similar to selective hot water isolation device 114(1) described above. For sake of brevity components which are substantially similar are not reintroduced here and instead a suffix "B" is used to distinguish components of selective hot water isolation device 114(3) from those of selective hot water isolation device 114(1). Note in this case, selective hot water isolation device 114(3) does not include a snap disk spring, such as snap disk spring 748 in FIG. 5. Instead, selective hot water isolation device 114(3) includes a coil spring 5202. In this case, the coil spring provides resistance to the downward motion of the piston 718B, rather than a snap disk spring. Selective hot water isolation device 114(3) includes seal 5204 between the piston 718B and the stem 720B, and has no inner cylinder liner (such as inner cylinder liner 728 in FIG. 5). Also note that in selective hot water isolation device 114(3) the piston seal 722B is a separate piece from the piston 718B, whereas in selective hot water isolation device 114(1) the piston seal 722 is formed as part of the piston 718 (see FIG. 5). Other differences in structures of the selective hot water isolation device are contemplated. For example, the bleed hole 730B in selective hot water isolation device 114(3) includes an elongate indentation 5206 and a small lower hole (shown but not designated) through the stem head 726B. Alternatively, the bleed hole could simply be a small circular hole formed through the stem head, without the elongate indentation 5206. FIG. 55 provides an overview of example operational stages of selective hot water isolation device 114(3). The labeled operational steps in FIG. 55 correlate roughly to the operational steps shown in FIG. 11 for selective hot water isolation device 114(1).

Figure 56:
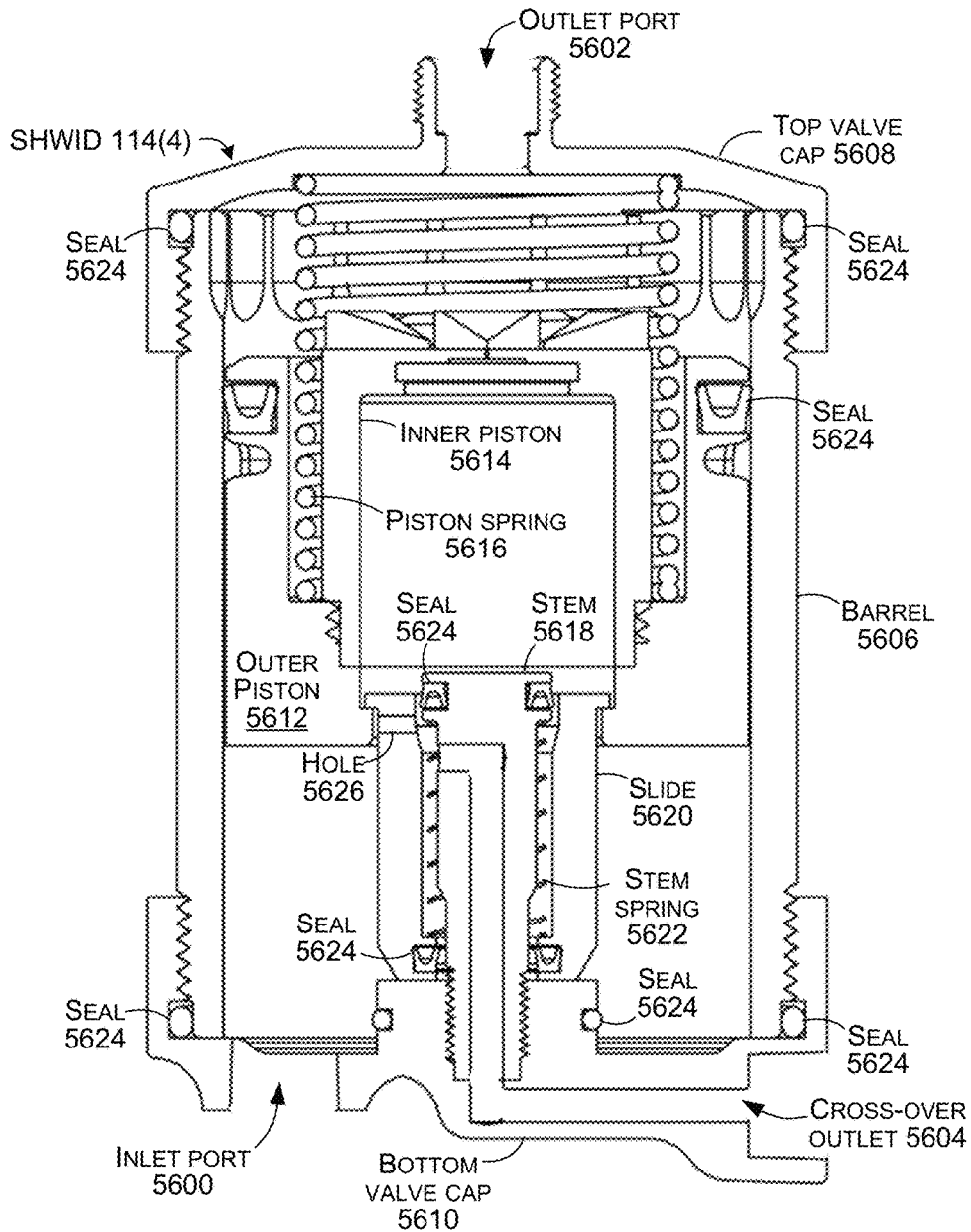
Figure 57:
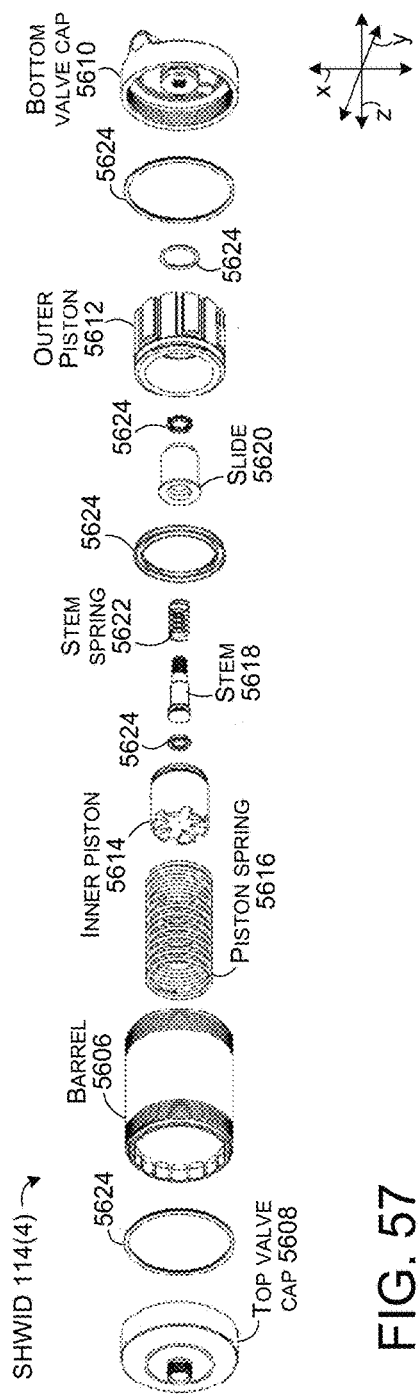
Figure 58:
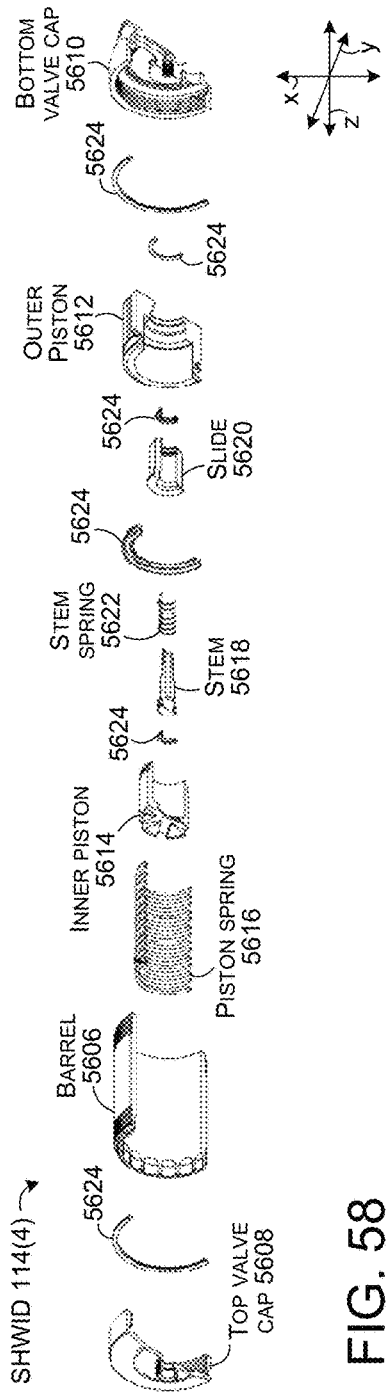
Figure 59:
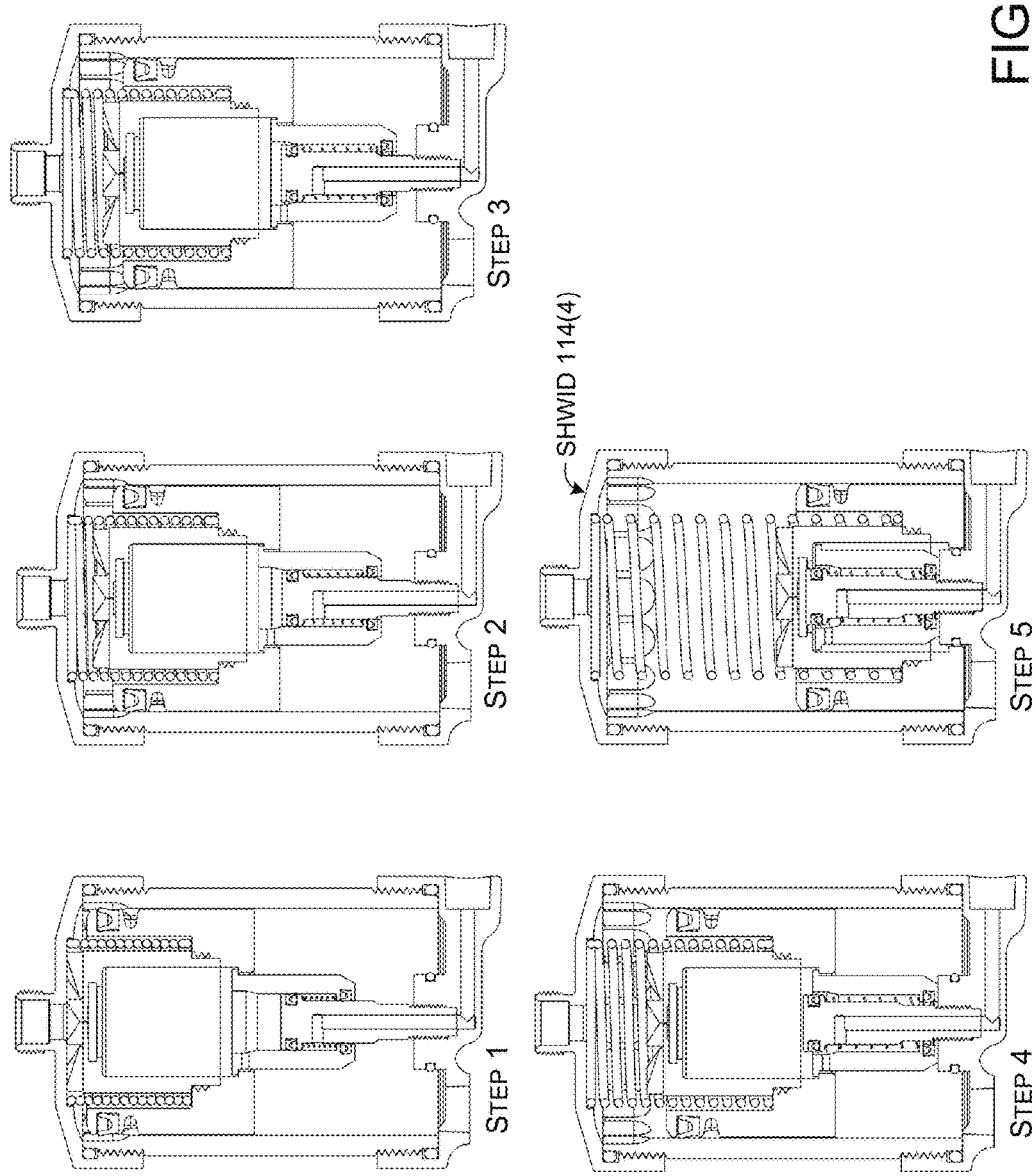

As shown in FIGS. 56 through 59, selective hot water isolation device 114(4) is substantially different from other example selective hot water isolation devices described above. FIG. 56 is a sectional view of selective hot water isolation device 114(4). FIG. 57 is an exploded perspective view, and FIG. 58 is an exploded, cut-away perspective view. FIG. 59 provides an overview of example operational stages of selective hot water isolation device 114(4).

Referring to FIG. 56, selective hot water isolation device 114(4) can include inlet port 5600, outlet port 5602, cross-over outlet 5604, barrel 5606, top valve cap 5608, and bottom valve cap 5610. Within the barrel, the selective hot water isolation device can include an outer piston 5612 and an inner piston 5614. The positions of the inner piston and outer piston can be fixed relative to one another. The inner and outer pistons can move vertically, along the z reference axis, within the barrel. Piston spring 5616 can be positioned between the inner and outer pistons. The piston spring can be supported on a lower end by a portion of the outer piston and can contact the top valve cap 5608 at an upper end, such that upward movement of the outer piston can compress the piston spring against the top valve cap. The selective hot water isolation device can also include stem 5618, slide 5620, and stem spring 5622. The stem can be fixed to the bottom valve cap 5610. The slide can be positioned around the stem and within the inner piston and can move vertically, along the z reference axis, relative to the stem and the inner piston. The stem spring 5622 can be positioned around the outside of the stem and within the slide. The stem spring can be supported on a lower end by a portion of the slide and contact a portion of the stem on an upper end such that upward movement of the slide can compress the stem spring. The selective hot water isolation device can also include various types of seals 5624. Note that the outer piston has vertical grooves around the outside (best viewed in FIG. 57). Also, the slide 5620 can include a hole 5626.

Referring to FIG. 59, in operation the selective hot water isolation device 114(4) can have functional stages similar to Steps 1 through 5 of selective hot water isolation device 114(1). For example, referring to FIGS. 56 through 59, in Step 1 hot water can be turned on at a fixture associated with selective hot water isolation device 114(4). The resulting pressure drop at outlet port 5602 relative to inlet port 5600 can cause the outer piston 5612 to rise, compressing the piston spring 5616. At this point, water can flow from the inlet port through the vertical grooves in the outer piston to the outlet port. As the outer piston rises, it can pull the slide upward, due to a lower rim of the outer piston catching and supporting an upper rim of the slide (shown but not designated). As the slide is pulled upward relative to the stem it compresses the stem spring.

In Step 2 hot water at the fixture can be turned off. At this point the resilient nature of the piston spring 5616 and the stem spring 5622 can help lower the outer piston 5612 through a cross-over delay in Step 3, to allow cold water cross-over flow in Step 4. During the cold water cross-over stage (Step 4), the slide 5620 has descended far enough that a seal on the stem 5618 has risen above the hole 5626 in the slide. This can allow cold water to flow from cross-over outlet 5604, through the stem 5618, through hole 5626, and down to inlet port 5600. Step 5 can represent a cross-over shutoff stage. During the cross-over shutoff stage (Step 5), in this case, the outer piston 5612 is lowered to a point where the lower rim of the outer piston 5612 contacts a seal on an inner portion of the bottom valve cap 5610, blocking the cold water cross-over flow.

For ease of explanation, three different selective hot water isolation devices 114(1), 114(2), and 114(3) were utilized in system 100. However, in many scenarios all or some of the selective hot water isolation devices used in a particular system will be identical. Further, while the selective hot water isolation devices are illustrated in system 100 with an exemplary automatic hot water recovery apparatus 108(1), these selective hot water isolation devices can be utilized with other types of automatic hot water recovery apparatuses. Note also that several novel functionalities are described in the above discussion and specific structures are described in great detail for achieving the novel functionalities. Of course, the listing of structures cannot be exhaustive and other structures for accomplishing the novel functions are contemplated.

Some of the present implementations can allow selective hot water isolation devices and automatic hot water recovery apparatuses to work together in an inter-related cooperative manner. In these implementations, each selective hot water isolation device can 'listen' and react to events throughout the hot water system to reduce (and/or prevent) cold water from entering the hot water system when the cold water is not needed to recover stranded hot water.

Some of the present implementations of the selective hot water isolation devices utilize a pressure differential acting on the appropriate piston surface area to power the piston through the timing interval. The pressure differential is altered and the surface area acted upon is altered to the appropriate use, delay, recovery, or cross-over shutoff mode.

Some of these selective hot water isolation device implementations meter through the delay interval rather than both the delay interval and the recovery interval. This configuration can reduce the volume of the cross-over valve. These aspects can contribute to a more reliable, less expensive and less intrusive hot water recovery process.

Example Hot Water Recovery Method

Figure 60:
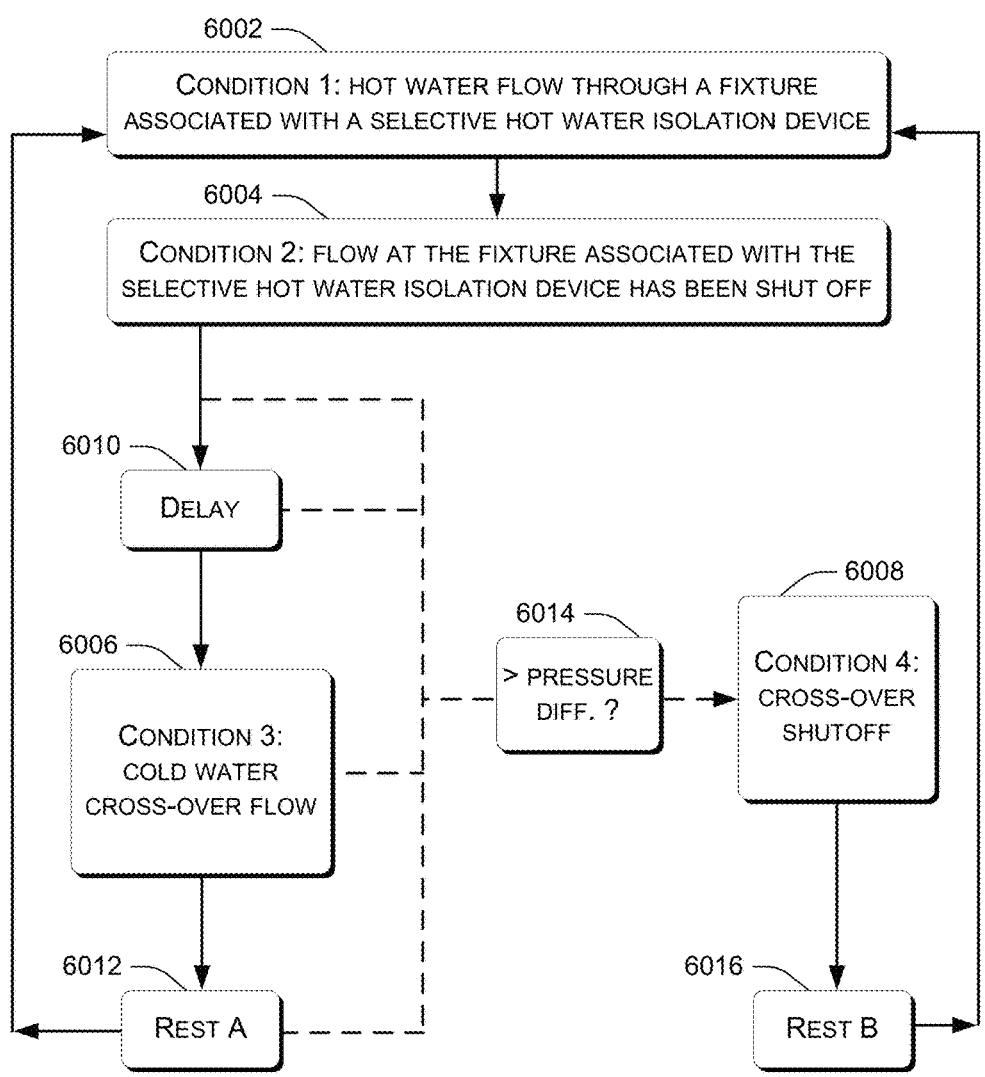
FIG. 60 is a flowchart of example hot water recovery techniques in accordance with some implementations of the present concepts.

FIG. 60 illustrates an example hot water recovery method 6000. The method can include Condition 1 at block 6002, Condition 2 at block 6004, Condition 3 at block 6006, and Condition 4 at block 6008. In this case, the method can begin with a Condition 1 at block 6002. Condition 1 can be hot water flow through a fixture associated with a selective hot water isolation device. The method can continue with Condition 2 at block 6004. Condition 2 can be flow at the fixture associated with the selective hot water isolation device has been shut off. Note that in this case, the method does not proceed from Condition 1 to any other condition besides Condition 2.

After Condition 2, method 6000 can continue to block 6006 which represents Condition 3, cold water cross-over flow. Cold water cross-over flow can result from a pressure differential caused by a contracting bladder of an automatic hot water recovery apparatus in the system. In this case, the method is shown with a Delay at block 6010 before Condition 3. In other implementations, the method can proceed to Condition 3 without a delay. Note that the method proceeds through Conditions 1 and 2 before arriving at Condition 3. Viewed another way, cold water cross-over flow can be blocked unless Conditions 1 and 2 occur.

After Condition 3, method 6000 can proceed to Rest A at block 6012. Rest A can represent a certain resting or steady-state position of the selective hot water isolation device. The selective hot water isolation device can remain in the Rest A position until Condition 1 at block 6002 occurs again.

Alternatively, the progression of method 6000 from Condition 2 through Condition 3 and back to Condition 1 can be interrupted, diverting to Condition 4 at block 6008. The diversion to Condition 4 is shown with dotted lines in FIG. 60. Condition 4 represents cross-over shutoff, which can be caused by hot water flow being turned on at a different fixture in the system. After Condition 2, the method can proceed to Condition 4 at several points, including before the Delay, during the Delay, during Condition 3, or from Rest A. Whether the method diverts to Condition 4 can be dependent on an excess pressure differential in the system (e.g., a pressure differential greater than the pressure differential of Condition 3). For instance, in one implementation, the pressure differential of Condition 3 can be about three to four pounds per square inch (3-4 psi). In this case, the diversion to Condition 4 can be triggered by an excess pressure differential, for example, a pressure differential of 5 psi, across the selective hot water isolation device at block 6014. In other implementations, a range of pressure differential corresponding to Condition 3 can be from 0 psi up to 5 psi. In still other implementations, the diversion to Condition 4 can be triggered by a lower or higher pressure differential, such as 3 psi or 10 psi, respectively. Stated another way, the system can be designed around a pressure differential such that further hot water flow through the system creates the excess pressure differential that can cause a different system performance than the pressure differential. The point of Condition 4 is to detect hot water flow at some point in the system and stop the cold water cross-over flow.

After Condition 4, when water in the system is turned off, method 6000 can proceed to Rest B at block 6016. Rest B can represent a different resting or steady-state position of the selective hot water isolation device. Also, the position of the selective hot water isolation device in Condition 4 and Rest B can be the same. The selective hot water isolation device can remain in the Rest B position until Condition 1 at block 6002 occurs again. Note that in this case, the method can only proceed from the Rest B position to Condition 1. In other implementations, Rest B can represent a different position than Condition 4, and further, Rest A and Rest B can represent the same position of the selective hot water isolation device.

The described method can be performed by the systems and/or devices described above relative to FIGS. 1 through 59, and/or by other devices and/or systems.

To summarize, the present techniques can offer hot water recovery for a system with a hot water heater. Following the use of hot water shutoff in the system, hot water stranded in pipes can be drawn back to the water heater by an automatic hot water recovery apparatus in part by allowing cold water cross-over from cold water pipes to hot water pipes. The cold water cross-over can be allowed after a delay, and can be driven by a contracting bladder of the automatic hot water recovery apparatus. Also, if hot water is drawn again in the system, the cold water cross-over can be interrupted to avoid unwanted cold water in the hot water pipes.

CONCLUSION

Although specific examples of hot water energy savings are described in language specific to structural features, it is to be understood that the subject matter defined in the appended claims is not intended to be limited to the specific features described. Rather, the specific features are disclosed as exemplary forms of implementing the claimed statutory classes of subject matter.

The invention claimed is:

1. A selective hot water isolation device that is configured to be connected in fluid flowing relation between a first portion of a hot water line and a second portion of the hot water line and in fluid flowing relation with a cold water line and where the selective hot water isolation device is configured to allow a hot water flow from the first portion of the hot water line through the selective hot water isolation device and into the second portion when water pressure drops in the second portion relative to the first portion and wherein the hot water flow through the selective hot water isolation device stops when pressure is restored in the second portion and wherein subsequent to the hot water flow the selective hot water isolation device is further configured to allow cold water cross-over from the cold water line to the hot water line in an instance where a pressure differential between the cold water line and the hot water line is greater than a first pressure value but less than a second pressure value and to stop the cold water cross-over when the pressure differential is less than the first pressure value or more than the second pressure value.

2. The selective hot water isolation device of claim 1, wherein the first pressure value is in a range from about 1 pound per square inch (psi) to about 4 psi and wherein the second pressure value is about 5 psi.

3. The selective hot water isolation device of claim 1, wherein the first pressure value is in a range from about 0 pounds per square inch (psi) to about 5 psi and wherein the second pressure value is greater than 5 psi.

4. The selective hot water isolation device of claim 1, wherein the water pressure drops in the second portion relative to the first portion when a valve on a fixture connected to the second portion is opened and the pressure is restored in the second portion when the valve is closed.

5. A selective hot water isolation device that is configured to be connected in fluid flowing relation between a first portion of a hot water line and a second portion of the hot water line and in fluid flowing relation with a cold water line and where the selective hot water isolation device is configured to allow a hot water flow from the first portion of the hot water line through the selective hot water isolation device and into the second portion under a first condition when water pressure drops in the second portion relative to the first portion and wherein the selective hot water isolation device is further configured to stop the hot water flow in a second condition when pressure is restored in the second portion and wherein subsequent to the hot water flow the selective hot water isolation device is further configured to allow cold water cross-over from the cold water line to the hot water line according to a third condition where a pressure differential between the cold water line and the hot water line is less than a fixed value and to stop the cold water cross-over of the third condition in a fourth condition where the pressure differential is greater than the fixed value.

6. The selective hot water isolation device of claim 5, wherein the third condition can only occur after the first condition and the second condition.

7. The selective hot water isolation device of claim 5, wherein the first and second conditions relate to pressure differentials between the first and second portions and the third and fourth conditions relate to pressure differentials between the cold water line and the first portion of the hot water line.

8. A selective hot water isolation device that is configured to be connected in fluid flowing relation with a hot water line and a cold water line and where the selective hot water isolation device is configured to control water cross-over from the cold water line into the hot water line based upon water pressure differences between the hot water line and the cold water line after water flow through the hot water line stops.

* * * * *